US012694347B1

(12) United States Patent　(10) Patent No.: US 12,694,347 B1
Katz et al.　(45) Date of Patent: Jul. 28, 2026

(54) INTELLIGENT AUTONOMOUS AND SEMI-AUTONOMOUS VARIABLE ALTITUDE VEHICLE DEPLOYMENT SYSTEM AND METHOD

(71) Applicant: UIPCO, LLC, San Antonio, TX (US)

(72) Inventors: Brian Howard Katz, San Antonio, TX (US); Surender Kumar, Palatine, IL (US); Jeffrey Thomas Cavanaugh, Sun City, AZ (US); Daniel Diaz, San Antonio, TX (US); Jennifer Holly Nance, San Antonio, TX (US); Robert Christian Law, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 142 days.

(21) Appl. No.: 18/497,660

(22) Filed: Oct. 30, 2023

Related U.S. Application Data

(60) Provisional application No. 63/381,713, filed on Oct. 31, 2022.

(51) Int. Cl.
G06Q 10/0631　(2023.01)
G06N 3/08　(2023.01)

(52) U.S. Cl.
CPC ........... G06Q 10/0631 (2013.01); G06N 3/08 (2013.01)

(58) Field of Classification Search
CPC .............................. G06N 3/08; G06Q 10/0631
USPC ......................................................... 705/7.12
See application file for complete search history.

(56) References Cited

U.S. PATENT DOCUMENTS

| | | | |
|---|---|---|---|
| 12,049,328 B2 * | 7/2024 | Sweeny ................. | B64U 80/70 |
| 12,184,803 B2 * | 12/2024 | Horelik ............... | H04M 3/5133 |
| 2022/0157178 A1 * | 5/2022 | Grace ................. | G01C 21/3833 |

FOREIGN PATENT DOCUMENTS

WO　WO-2017223531 A1 * 12/2017 ............. B64U 10/60

* cited by examiner

*Primary Examiner* — Patricia H Munson
(74) *Attorney, Agent, or Firm* — Plumsea Law Group, LLC

(57) ABSTRACT

A damage response system for deploying autonomous vehicles and providing services to a disaster-impacted location is disclosed. The system includes a damage detection module and a deployment manager. In response to information about a disaster at a specific location, the system will determine the extent of the damage and generate a curated selection of autonomous vehicles to travel to the location. The autonomous vehicles will be automatically selected based on their capacity to handle specific tasks that are needed based on the damage assessment performed by the damage detection module. The selected autonomous vehicles can then be automatically dispatched to the impacted area.

20 Claims, 11 Drawing Sheets

600

2019 TORNADO - SOUTHSIDE

610

620

630

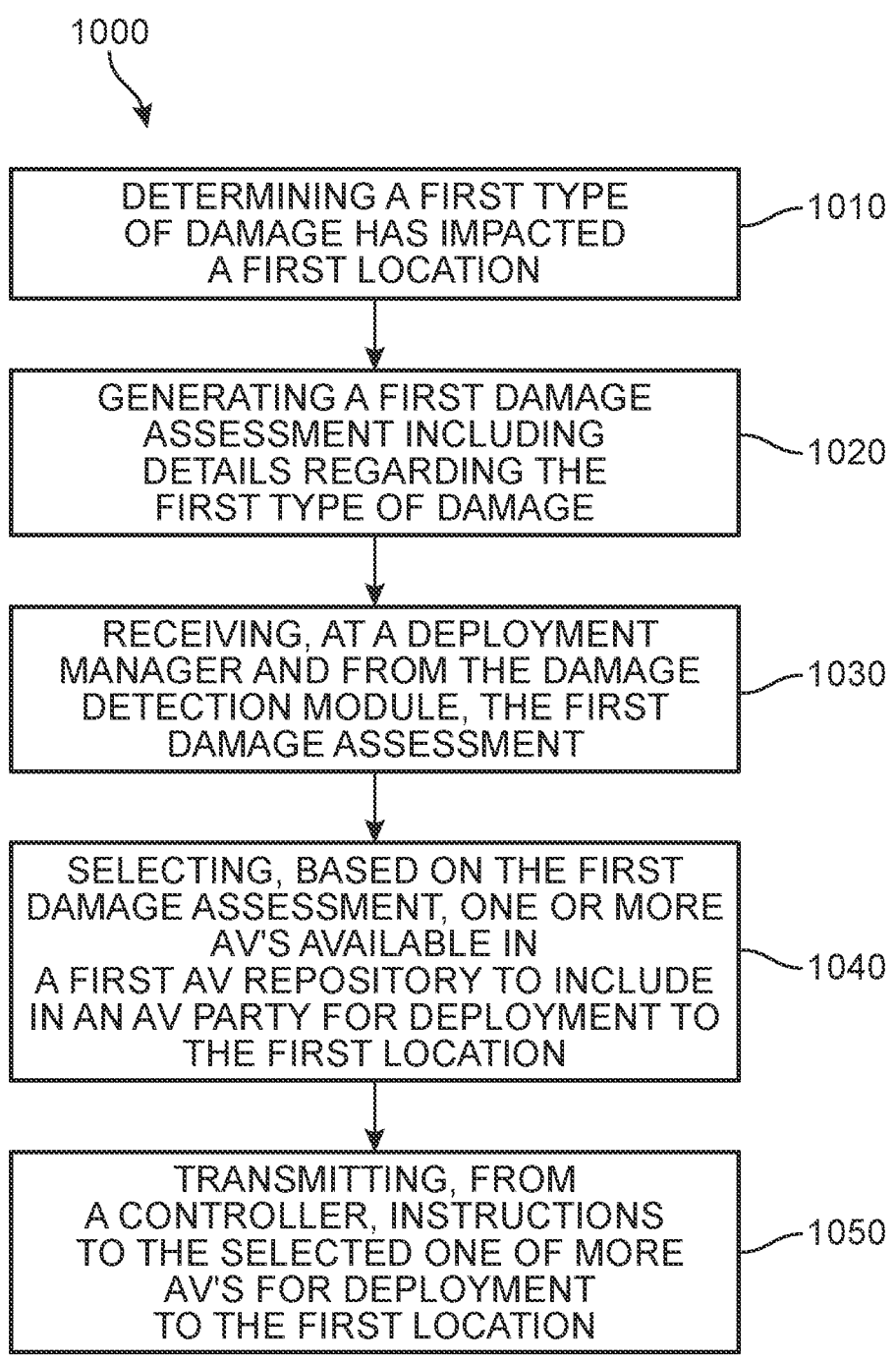

1000

DETERMINING A FIRST TYPE
OF DAMAGE HAS IMPACTED
A FIRST LOCATION —1010

GENERATING A FIRST DAMAGE
ASSESSMENT INCLUDING
DETAILS REGARDING THE
FIRST TYPE OF DAMAGE —1020

RECEIVING, AT A DEPLOYMENT
MANAGER AND FROM THE DAMAGE
DETECTION MODULE, THE FIRST
DAMAGE ASSESSMENT —1030

SELECTING, BASED ON THE FIRST
DAMAGE ASSESSMENT, ONE OR MORE
AV'S AVAILABLE IN
A FIRST AV REPOSITORY TO INCLUDE
IN AN AV PARTY FOR DEPLOYMENT TO
THE FIRST LOCATION —1040

TRANSMITTING, FROM
A CONTROLLER, INSTRUCTIONS
TO THE SELECTED ONE OF MORE
AV'S FOR DEPLOYMENT
TO THE FIRST LOCATION —1050

FIG. 10

INTELLIGENT AUTONOMOUS AND SEMI-AUTONOMOUS VARIABLE ALTITUDE VEHICLE DEPLOYMENT SYSTEM AND METHOD

CROSS-REFERENCE TO RELATED APPLICATION

This application claims the benefit of U.S. Provisional Patent Application Ser. No. 63/381,713 filed on Oct. 31, 2022 and titled "Intelligent Autonomous and Semi-Autonomous Variable Altitude Vehicle Deployment System and Method", the disclosure of which is incorporated by reference herein in its entirety.

TECHNICAL FIELD

The present disclosure generally relates to autonomous vehicle (AV) deployment systems, and in particular to systems and methods for determining optimal deployment configurations for autonomous vehicles in response to damage occurring during catastrophic conditions.

BACKGROUND

During disasters such as hurricanes, tornadoes, floods, and fires, residents of the associated disaster area are often forced to evacuate their homes. This makes performing recovery efforts for these residents difficult, as homes are damaged and remain vulnerable to the elements, and in many cases access to the buildings can be blocked or otherwise remain inaccessible for normal traffic. However, the period directly following such events is often a critical time for taking actions that can prevent long-term damage to the home, life, or other belongings. The longer a structure or vehicle remains exposed to contaminants such as flood water, rain, hail, snow, or other undesirable elements; the greater the likelihood that the damage will be permanent or that repairs will require an extended duration, escalate in scope and cost, or be cost-prohibitive (to where the real property may require complete replacement—i.e., total loss). It may also drive other indirect costs to the insurer and insured such as temporary shelter, transport, and related living expenses. In cases where insurers are responsible for a settlement, delays in assessing damage or initiating repair or cleaning of the structure are typically associated with a rising payout to handle the higher level of damage. A structure will benefit from damage control that can commence immediately following the disaster, both in terms of cost and overall loss. The human inhabitants of the damaged property will similarly benefit-through reduced time/cost of temporary housing, repair cycle supervision, and in avoidance of the complexity/cost of finding/building a new/replacement residence in the event of such interventions avoiding a total loss of the property. Unlike humans, autonomous vehicles can be dispatched to render aid or collect information even in emergency conditions. Unfortunately, deployment of autonomous vehicles, or other robotic devices, can be at odds with the actual needs of the situation on the ground. For example, an autonomous vehicle configured to handle wildfires should not be dispatched to a flooded region. There are often delays in determining what type of autonomous vehicle(s) are appropriate and/or how many autonomous vehicles should be deployed to facilitate the best outcome for the affected parties, which can negatively impact recovery efforts. Disaster response can be better tailored to the conditions if the conditions are known prior to deployment.

There is a need in the art for a system and method that addresses the shortcomings discussed above.

SUMMARY

In one aspect, a method of providing services to a disaster-impacted location is disclosed. The method includes a first step of automatically determining, at a damage detection module, that a first type of damage has impacted a first location, and a second step of automatically generating, at the damage detection module, a first damage assessment including details regarding the first type of damage. A third step includes receiving, at a deployment manager and from the damage detection module, the first damage assessment, and a fourth step includes automatically selecting, at the deployment manager and based on the first damage assessment, one or more autonomous vehicles available in a first autonomous vehicle repository to include in an autonomous vehicle party for deployment to the first location. A fifth step includes transmitting, from a controller, instructions to the selected one of more autonomous vehicles for deployment to the first location.

In another aspect, a damage response system used to provide services to a disaster-impacted location is disclosed. The system includes a damage detection module configured to generate a damage assessment based on a plurality of aerial sensor data of a first location, and a deployment manager configured to select an autonomous vehicle party comprising one or more autonomous vehicles for deployment to the first location based on the damage assessment.

In another aspect, the disclosure describes a system for providing services to a disaster-impacted location. The system includes one or more computers and one or more storage devices storing instructions that are operable, when executed by the one or more computers, to cause the one or more computers to: (1) automatically determine, at a damage detection module, that a first type of damage has impacted a first location; (2) automatically generate, at the damage detection module, a first damage assessment including details regarding the first type of damage; (3) receive, at a deployment manager and from the damage detection module, the first damage assessment; (4) automatically select, at the deployment manager and based on the first damage assessment, one or more autonomous vehicles available in a first autonomous vehicle repository to include in an autonomous vehicle party for deployment to the first location; and (5) transmit, from a controller, instructions to the selected one of more autonomous vehicles for deployment to the first location.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 10 is a flow chart depicting a process of providing services to a disaster-impacted location, according to an embodiment.

DESCRIPTION OF EMBODIMENTS

Figure 1:
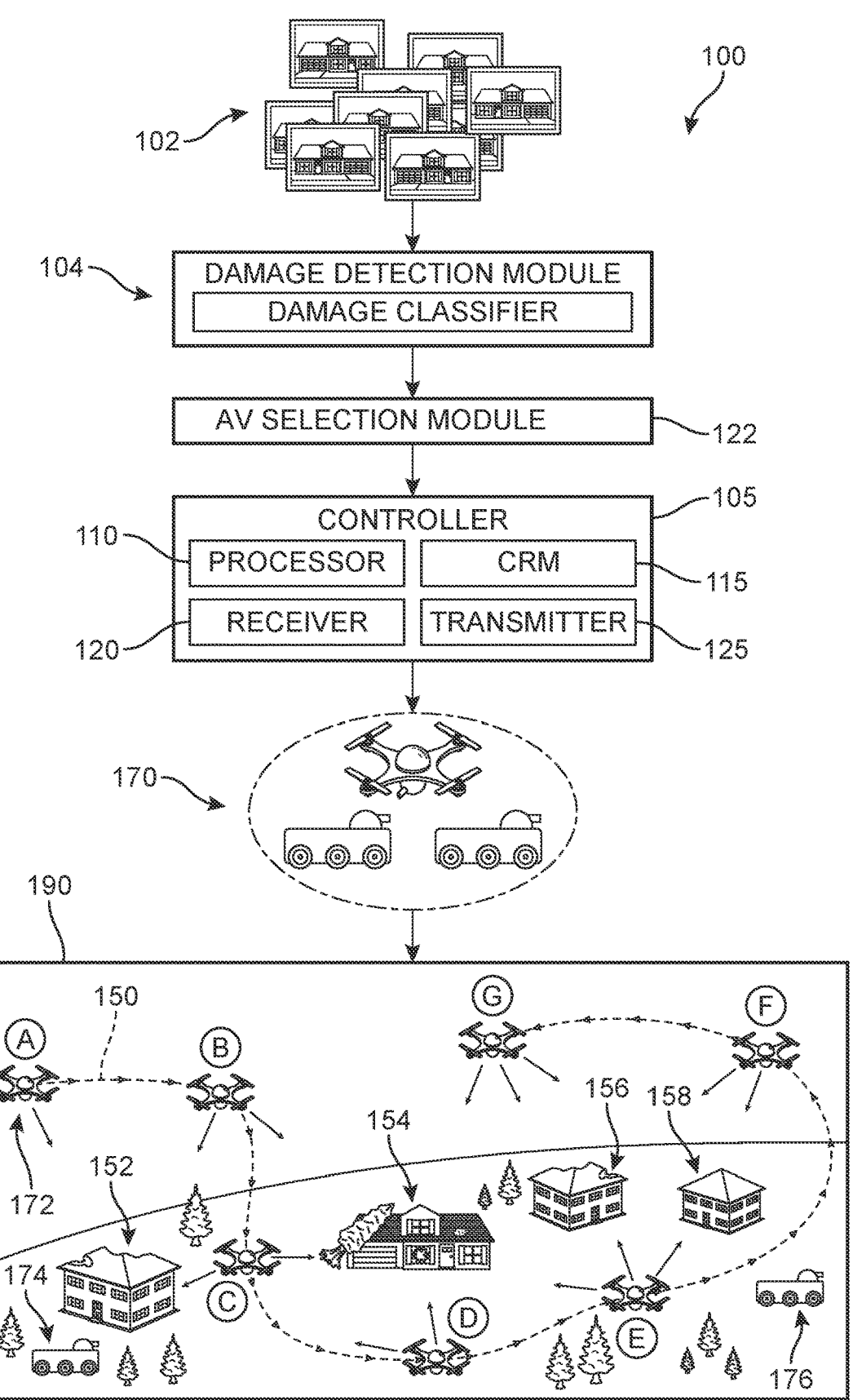
FIG. 1 depict a schematic illustration of a damage response system, according to an embodiment.

The disclosed post-disaster condition monitoring systems may include several features for assessing the conditions in a disaster area, which may enable more effective, efficient, and prioritized disaster response. The disclosed systems may be configured to process satellite sensor data to detect areas impacted by natural disasters or other catastrophic events. These datasets may be combined and analyzed in order to provide a clear illustration of the conditions across the various regions of a disaster area. In different embodiments, the proposed systems apply machine learning techniques to intelligently deploy autonomous vehicles of different levels (e.g., based on the five levels of autonomy for vehicles including (a) Level 1 (Some Driver Assistance), Level 2 (Partial Driving Automation), Level 3 (Conditional Driving Automation), Level 4 (High Driving Automation), and Level 5 (Full Driving Automation)) and/or other semi-autonomous, drone-based, robotic devices, or other devices or vehicles configured for data capture (collectively referred to herein as autonomous vehicles or data capture devices) during a catastrophe. For example, the system would utilize multiple stages for deploying robotic devices. In a first stage, the satellite sensor data would be analyzed for signs of damage in various areas using various computer vision and statistical algorithms. For purposes of this application, the term "damage" can refer to actual physical damage, as well as to conditions on the ground relevant to the deployment strategy decision response. Some non-limiting examples of such conditions can include a radiation hazard, flood hazard, electrical line hazard, explosive gas hazard, armed insurgents, avalanche, etc. In a second stage, the output from the analysis of the datasets and derived datasets could be used as input to a neural net that would output an optimal deployment configuration (autonomous vehicle party) of autonomous vehicles or other robotic devices.

As will be described in greater detail below, in some embodiments, this type of optimization could be done before any autonomous vehicles have been deployed. In other embodiments, following the initial satellite data analysis, trucks, large delivery vehicles, blimps, planes, helicopters, ships, or other transportation devices (which themselves may be autonomous, semi-autonomous, or human piloted), can carry or transport groups of autonomous vehicles to be deployed to major damage areas, and then the second stage could be performed. In such embodiments, additional environment information gathered by the trucks or other vehicles could also be used as inputs to the optimized deployment neural network. In different embodiments, deployment patterns or configurations may also be determined according to the different kinds of autonomous vehicles that are currently available for deployment for the given area. For example, autonomous vehicles with sensors for sensing heat and/or fires could be sent to areas with fire damage, while autonomous vehicles with sensors for monitoring flooding conditions could be sent to areas with water damage. Likewise, larger autonomous vehicles with larger radii of operation could be designated for transit to more distant locations. In some other embodiments, vehicles that have been registered with the system could act as beacons that autonomous vehicles can use as waypoints or for refueling (e.g., battery exchanges for longer sorties). In one embodiment, the vehicle locations could also be used as inputs to the deployment optimization net.

It should be appreciated that the sensor data that can be collected and/or used by the systems described herein can be visual and/or non-visual. For example, data can be obtained from low-earth orbit satellite, geosynchronous satellite, gliders, drones, planes, helicopters, airborne-capable robot, balloons, blimps, sensor-carrying organic life, fixed or other aerial devices, as well as terrestrial images (e.g., autonomous ground vehicles, fixed position ground sensors, autonomous ground robotics, etc.) Thus, although the examples presented in the drawings depict image-based sensor data for purposes of simplicity, it is to be understood that the datasets are not limited to images, and can include, for example, signal and sensor data, multi-spectral, EMF, gravimetry, thermal, acoustic, magnetometric, radiometric, particle detection (PM, alpha/beta particle detection), neutron detection, gamma ray detection, gaseous species detection, ionic species detection, and other such types of data.

In some examples, the embodiments could provide an intelligent autonomous vehicle dispatch management system that can be triggered during emergencies or other scenarios where a house or other building or vehicle(s) have been exposed to catastrophic conditions. For example, following a flooding event, homes are vulnerable to moisture-related damage such as mold and mildew or mudflow. When heavy rain falls on land that lacks adequate surface vegetation, it can cause mudslide and/or mud flow. This is especially true during rainy season, and if a home is located downhill from an area where trees and other vegetation has been removed. In such scenarios, users may not be on-site, having evacuated themselves, or may be unable to initiate the cleaning process due to lack of the necessary hardware or safety gear. Unfortunately, water damage due to events such as flooding, sewage back-up from flooding in the area, plumbing or roof leaks, damp basement or crawl spaces, overflows from sinks or bathtub, or high humidity, if not dealt with within 24-48 hours, will become a breeding ground for mildew and mold. Even worse, the impact will continue to grow until steps are taken to eliminate the source of contamination. The return of residents must often be delayed by contaminated floodwaters in the surrounding region, or water that might be electrically charged from underground or downed power lines, which further delays the critical clean-up. In addition, in cases where mud has contaminated the home, such as on the walls or floors, waiting until the mud has dried only exacerbates the potential for damage and mold growth. Dust held in the caked mud left behind from a flood can contain harmful bacteria. Instead, it is recommended that the hard dirt and mud be moistened or misted before clearing the residue with a wet/dry shop vacuum. If residents are unable to initiate the clean-up process while the mud is soft, the process becomes riddled with potential health hazards that can inhibit entry by humans. In these situations, autonomous vehicles can serve essential functions that would otherwise be impossible to perform.

As a general matter, negative effects of flooding on building envelopes are well known. Some effects can include (a) loss of material in the affected structure due to changes in water volume when changing the physical phase and/or when chemical substances contained in water (e.g., salt) react with the affected material (e.g., plaster), (b) worsening of user's health and comfort due to the growth of mold in non-nutritive moist materials with traces of organic matter contamination, and (c) increase in energy consumption due to the lower thermal resistance of moist materials compared to dry materials leading to a lower degree of insulation of a building. These and other negative effects can result in outcomes that cause (a) catastrophic consequences for the integrity of the building, (b) illness and discomfort to users, and (c) high levels of energy waste, resulting in both increased economic costs and pollution. Thus, the objective of impacted homeowners following a flood is to get the house cleared of all wet debris to discourage the growth of mold and to allow the structure to dry out quickly so reconstruction can begin as soon as possible.

In these and other scenarios where damage is caused following a disaster, the proposed systems can help reduce the impact of the disaster (e.g., before permanent damage occurs) by offering a mechanism by which a select group of autonomous or semi-autonomous unmanned vehicles (collectively referred to as autonomous vehicles) can be deployed to initiate and expedite the damage assessment and/or clean-up process. The proposed embodiments thereby allow for these vital efforts to be conducted during the window of time directly subsequent to (or even during) the catastrophic event, even while conditions remain dangerous for human visitors.

For purposes of introduction, an overview of one embodiment of the proposed systems and methods is illustrated with reference to FIG. 1. FIG. 1 is a schematic illustration of an automated disaster damage response system 100. As shown in FIG. 1, the damage response system 100 may include a damage detection module 104 with a damage classifier. The damage detection module 104 can receive input 102 in the form of a plurality of datasets captured by satellites above the impacted region. In different embodiments, the datasets can include visual-based data such as ultraviolet, infrared, rendered, video, multi-spectral images, etc., as well as gravimetric, magentometric, EMF, radiometric, particle counter-based, etc. Thus, the term aerial imagery should be understood to encompass images or videos, EM, compression wave, or other particle/wave detections (irrespective of frequency/spectrum) which can be used to receive/convey data about the targeted location. The data can be captured by any type of aerial device, which includes both intra-atmospheric as well as extra-atmospheric.

Figure 2A:
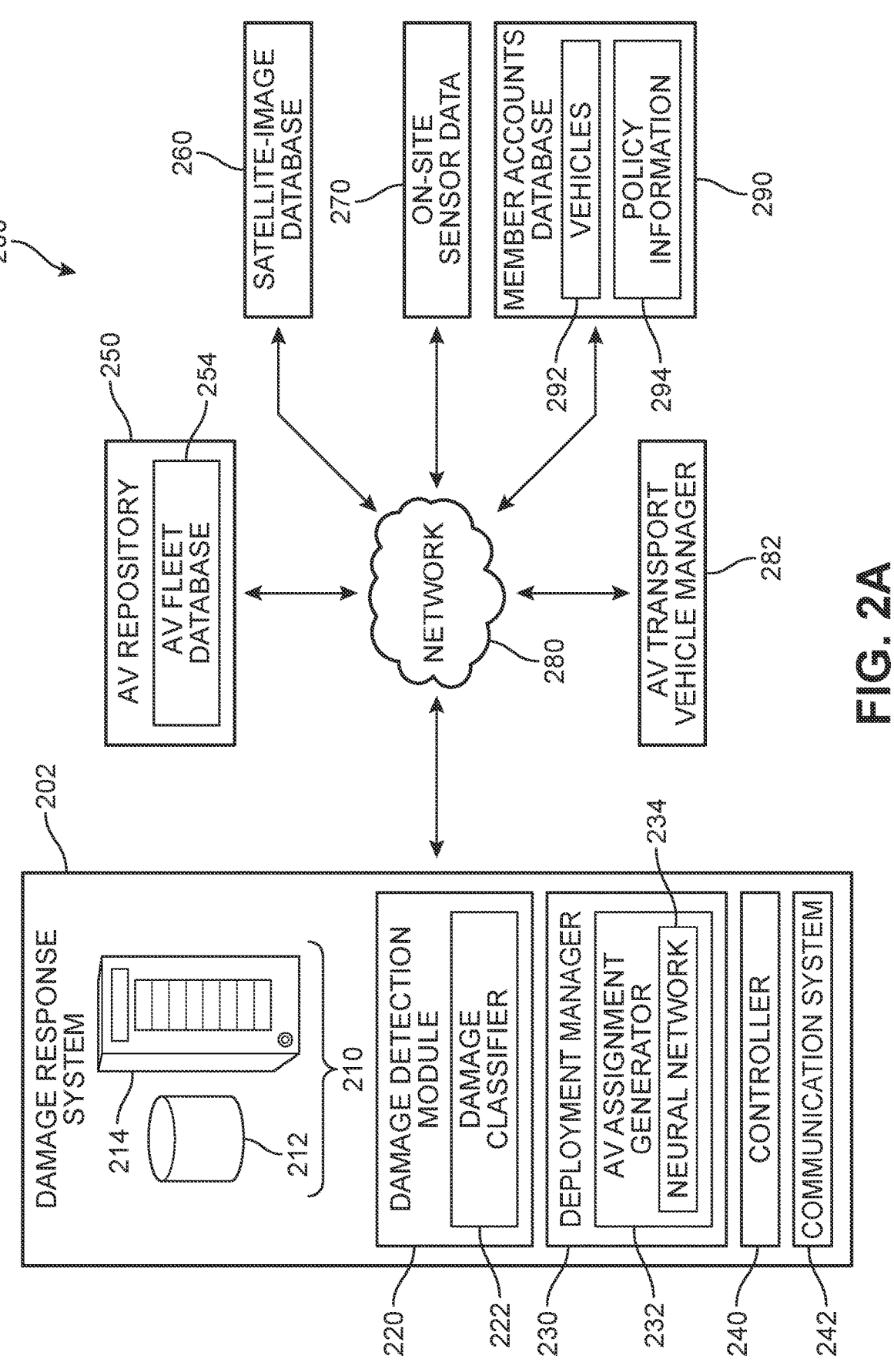
FIG. 2A is a schematic illustration of an environment for a damage response system and associated components, according to an embodiment.

As will be described in greater detail in FIG. 2, the damage detection module 104 can be configured to determine whether there is damage in a specific region ("target region" or "target site" or "target area"), and the type or pattern of damage that most likely exists.

The target site may include various structures, such as a residence. As used herein, the term "building" or "structure" can refer to any kind of building, such as a home, or other residential building, a shed, barn, a commercial building, maritime vessel or platform, tower, or any other related structures. A building typically can include a roof, room, walls, support structures, windows, or other features. In some cases, the primary structure can be associated with additional secondary structures, features, or property that may be disposed adjacent to or otherwise near the primary structure. The damage detection module 104 can be used to assess damage to these structures based on the received aerial/satellite datasets.

As shown in FIG. 1, damage response system 100 may include a controller 105. Controller 105 may include various computing and communications hardware, such as servers, integrated circuits, displays, etc. Further, controller 105 may include a device processor 110 and a non-transitory computer readable medium 115 including instructions executable by device processor 110 to perform the processes discussed herein. The components of controller 105 may be implemented in association with a mobile conditions monitoring center, such as vehicle, or in association with one or more control center(s) or conditions monitoring center(s) located in one or more permanent building(s) (i.e., brick and mortar establishment).

The non-transitory computer readable medium may include any suitable computer readable medium, such as a memory, e.g., RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, a read-only memory (ROM), a random access memory (RAM), a static random access memory (SRAM), a portable compact disc read-only memory (CD-ROM), an erasable programmable read-only memory (EPROM or Flash memory), a digital versatile disk (DVD), a memory stick, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

Controller 105 may include networking hardware configured to interface with other nodes of a network, such as a LAN, WLAN, or other networks. In Further, controller 105 may be configured to receive data from a plurality of sources and communicate information to one or more external destinations. Accordingly, controller 105 may include a receiver 120 and a transmitter 125. (It will be appreciated that, in some embodiments, the receiver and transmitter may be combined in a transceiver.) Any suitable communication platforms and/or protocols may be utilized for communication between controller 105 and other components of the system. Since the various sources of information may each have their own platform and/or protocol, damage response system 100 may be configured to interface with each platform and/or protocol to receive the data.

As shown in FIG. 1, damage detection module 104 may be configured to identify aspects regarding the conditions in a disaster area via damage classifier. For example, damage detection module 104 may identify electrical power outage status, flooding indicators, fire indicators, etc. In some embodiments, damage detection module 104 may be configured to receive information reported by users. For example, damage detection module 104 may be configured to receive information from a user (if there are such persons) who is on-the-ground in the target region. In some embodiments, damage detection module 104 may be configured to receive photographic images from such persons, in addition to satellite imagery. These images of a disaster area enable an autonomous vehicle selection module 122 of the damage response system 100 to make determinations regarding the best and most urgent way to respond to a disaster, in particular by dispatch of autonomous vehicles to the location.

For example, as shown in FIG. 1, the autonomous vehicle selection module 122 can receive a damage assessment report from the damage detection module 104. Based on the type, severity, and range of damage identified by the damage detection module 104, the autonomous vehicle selection module 122 can select one or more autonomous vehicles from its database listing one or more autonomous vehicles comprising a fleet of autonomous vehicles stored in an autonomous vehicle repository in range of the target location as suitable to monitor and/or serve the given disaster area. The autonomous vehicle selection module 122 can then transmit a request or selection to the controller 105. In response, the controller 105 can transmit instructions to the selected autonomous vehicles to initiate deployment. FIG. 1 illustrates three such autonomous vehicles being selected and dispatched (a first autonomous vehicle group 170), including a first autonomous vehicle 172, a second autonomous vehicle 174, and a third autonomous vehicle 176. As shown in FIG. 1, these autonomous vehicles may be aerial, maritime surface or sub-surface, subterranean, extra-atmospheric, and/or land-based vehicle autonomous vehicles. In some embodiments, watercraft autonomous vehicles and/or other types of autonomous mobile robotic devices may be selected for deployment. In this example, the first autonomous vehicle group 170 has been dispatched to a first impacted area 190 including multiple damaged structures. The first autonomous vehicle 172—an aerial autonomous vehicle—has been selected in order to capture and record additional details of the damage to the individual homes in the first impacted area 190, including a first home 152, a second home 154, a third home 156, and a fourth home 158. Furthermore, the second autonomous vehicle 174 (a land-based vehicle autonomous vehicle) approaches the first home 174 to provide floodwater draining assistance, while the third autonomous vehicle 176 works on carrying debris from around the third home 156 to a location some distance away from the house to prevent additional damage and clear the path for subsequent repair work. Thus, each of the autonomous vehicles are configured to provide an essential function, where each autonomous vehicle's primary function was selected by the autonomous vehicle selection module 122 based on the report generated by the damage detection module 104.

FIG. 2 depicts a schematic view of an embodiment of a damage management response environment 200 which may be used to automatically determine an optimal autonomous vehicle configuration for disaster coverage missions and dispatching the configuration of one or more autonomous vehicles to a designated area for example, after a disaster such as a hurricane, fire, tornado or flood. The environment 200 can be seen to include a damage response system 202, which can include or be in communication over a network 280 with one or more of an autonomous vehicle repository 250, a aerial image and sensor data database 260, a member accounts database 290, autonomous vehicle transport vehicle manager 282, and on-site sensor data 270.

In different embodiments, damage response system 202 includes provisions for gathering information about potentially damaged structures following a disaster that can be used to facilitate relief efforts of the disaster area. The damage response system 202 may also include provisions for processing sensor data and for communicating with various other systems. In different embodiments, some of the steps may be performed by ground-based computing system(s) (e.g., damage response system 202) and some of the steps may be performed by computing components associated with the autonomous vehicle transport vehicle manager 282, which can include or have access to modules of the damage response system 202.

As seen in FIG. 2, damage response system 202 comprises a computing system 210. Computing system 210 can include, for example, a computer 212 and a database 214. Computer 212 may further include one or more processors and memory. Computer 212 could be any kind of computer such as a desktop computer, a laptop computer, a server, or any other kind of computer with sufficient computing resources for performing tasks such as image classification.

Damage response system 202 may also include a damage detection module 220, which further includes a damage classifier 222. In different embodiments, damage classifier 222 may be any program or algorithm that is used to classify images and/or non-visual sensor data according to the degree and/or type of damage the structure has sustained. In some embodiments, damage classifier 222 includes one or more machine learning models. In one embodiment, damage classifier 222 could include a convolutional neural network. In other embodiments, damage classifier 222 could comprise any other algorithm (or set of algorithms) from the field for machine learning and/or machine vision. As a general matter, these images and sensor datasets can be obtained from aerial image and sensor data database 260, which can offer real-time data for the target location. For example, in some embodiments, data can be collected during manned or other unmanned aviation fly-bys over the target location to build a better localized and instantaneous report of near-current damage conditions. This can include raw weather data collected by some type of sensor suite including surface and airborne observations, radar, lightning, satellite imagery, and profilers.

In some cases, real-time weather information can be obtained via Flight Information Services (FIS), which is a mechanism for disseminating meteorological (MET) and aeronautical information (AI) to displays in the cockpit in order to enhance pilot situational awareness, provide decision support tools, and improve safety. FIS augments traditional pilot voice communication with Flight Service Stations (FSSs), ATC facilities, or Airline Operations Control Centers (AOCCs). FIS can provide textual and graphical information that can be used by the module to fine-tune the recommended flight path closer to the expected time of departure. Specifically, an FAA-sponsored system referred to as FIS-B may be accessed to receive and display a suite of broadcast weather and aeronautical information products. In other cases, non-FAA FIS Systems can be used to obtain FIS data over both the aeronautical spectrum and on other frequencies using a variety of data link protocols.

In some other examples, reported weather conditions applicable to likely damage in the target location can be obtained from one or more available sources, such as but not limited to METARs/SPECIs, PIREPs, RAREPs. In one embodiment, the system can monitor the ADS-B flight tracks (position, heading, speed, altitude) for planes flying over or near the target location and/or over a portion of the route to be taken based on the generated flight path to determine the environmental conditions. Such data sources offer real-time, highly accurate information about environmental conditions in the target location. One or more of these and other data sources can provide information that can cause the damage detection module to estimate an impact on the region.

In different embodiments, a machine learning model can be used by the damage detection module 220 to determine whether there is a high likelihood of damage resulting from the natural disaster. For example, damage to portions of a roof, and/or a solar panel, as well as a broken window and a fallen tree can be identified by the classifier as representing a specific type/magnitude of damage. For each loss identified, the system can be configured to further determine the extent of the damage, as well as generate a repair estimate. In some examples, 3D models can be used to determine the dimensions for various portions of the building, providing such estimates with a high degree of accuracy. Furthermore, in some embodiments, the system may apply visual indicators to the areas where deviation (or damage) may have occurred or otherwise highlighting the location(s) of deviations that are suggestive of possible damage. Visual indicators may alert a user that further inspection of this part of the building structure is needed. In some cases, this information could be further used to deploy autonomous vehicles to capture further visual and non-visual datasets for insurance, emergency management, human extrication, or purposes.

Furthermore, in some embodiments, a deep learning model can be used to estimate damages across different portions of the building and/or output of a 2D "heat map" of probable damage at different portions of the building. In other words, in different embodiments, aerial sensor data may be analyzed to determine if structure has sustained roof or other structural damage. For example, image data and directional lidar, sonar, or radar may be analyzed to determine if a roof at a certain coordinate has all of its corners and edges and whether said corners and edges of said roof appear to be damaged. In another example, image data is analyzed to determine the extent of damage that has occurred (e.g., the percentage of damage to a component (e.g., roof) of structure, as well as identify which portion of the structure is damaged (e.g., roof, walls, windows, porch, or personal property).

In some embodiments, water reflectivity can be measured using an image sensor in the visual spectrum with presence of a visual light source, or with an infrared (IR) source on the autonomous vehicle. For example, an IR sensor could then be leveraged to determine a likelihood of water inside of the home through an opening in the room, or otherwise around the house, allowing for an estimation of the level of water inundation in structure.

In some embodiments, satellite imagery can be input to the deep learning damage detection model in order to generate bounded regions in which the detected damage is located. The high-resolution imagery is then further processed to determine centroids for the damage and the probable extent of the damage as it radiates outward from the centroid. For example, a heat map or other a data visualization technique may be generated that shows magnitude of damage assessed as color in two dimensions. The variation in color may be by hue or intensity, giving obvious visual cues about how the damage is clustered or varies over space. Such representations offer end-users a mechanism by which to visualize complex data and understand it at a glance. In other words, the system assigns different damage values or ranking and presents this information in an easily consumable format similar to infrared or heat maps, where the hue or intensity is more pronounced toward the portion of the structure where the damage was greatest. In another example, the pixel information from an image may be used to create a damage intensity plane that depicts an indication of intensity of damage across a selected area.

In different embodiments, the heat map may make use of image processing techniques to help determine the extent of damage, such as filtering, edge detection (e.g., Sobel operator, Prewitt operator, etc.), image hue, saturation, intensity, color, etc. thresholding, or binary image morphology. Image processing techniques to help determine damage include information associated with trained machine learning engines, image classification algorithms, multi class classification, and anomaly detection. In some embodiments, these techniques may be used to correlate particular types and levels of damage or material properties when a threshold is reached. Filtering and transform operators may enhance the image features indicative of damage. Thresholds applied to enhanced pixel values may help to classify regions of damage for detection both spatially within the image and in terms of magnitude relative between regions within an image and relative between images. This may be a learned process where determined thresholds are a function of information such as anticipated damage type, lighting, time of day the picture was taken, or the sensor that recorded the images. In different embodiments, learning (or training) may be implemented by common machine learning algorithms, such as tensor flow, support vector machine, neural networks, autoencoders, Gaussian mixture models, or Naïve Bayes models, among others.

In different embodiments, insurance or other damage-related claims may be proactively created based on the damage assessment generated by the damage detection module 220. In another example, hyperspectral imagery is taken, utilized, and analyzed to determine information such as what kind of damage was sustained, to determine for example whether water damage was caused by salt water or fresh water. The type of water damage may be utilized to determine if an insurance claim should be characterized as flood or storm damage or the extent of damage, such as damage to carpet, wood flooring, or the like. In another example, the aerial vehicle may gather thermal, LiDAR, sonar, or radar imagery, which may be utilized to identify hail (or other) damage to a home's roof.

In different embodiments, both damage response system 202 and autonomous vehicle transport vehicle manager 282 can include communication systems (e.g., communication system 242). For example, these communication systems enable information to be transmitted between damage response system 202 and other components of the environment 200 via network 280. Thus, the type of communication components used in each communication system can be selected according to the type of network used. In some cases, a cellular or satellite network could be used so that each communication system includes a cellular radio or other component that enables cellular communication. In other cases, network 280 could comprise any kind of local area network and/or wide area network and/or ad-hoc point-to-point or multi-casting networks. In some cases, network 280 may be a Wi-Fi and/or Bluetooth network. One or more components of damage response system 202 could be disposed within a single computing device. Examples of computing devices that could be used include, but are not limited to: laptop computers, tablet computers, smartphones or other computing devices.

Damage response system 202 may also include a deployment manager 230. Deployment manager 230 may include any program or algorithm that is used to determine what grouping or assortment of autonomous vehicles ("autonomous vehicle party") for use at one or more specified target locations would be appropriate and accommodate the needs of that area based on the parameters identified by the damage detection module 220.

Figure 2B:
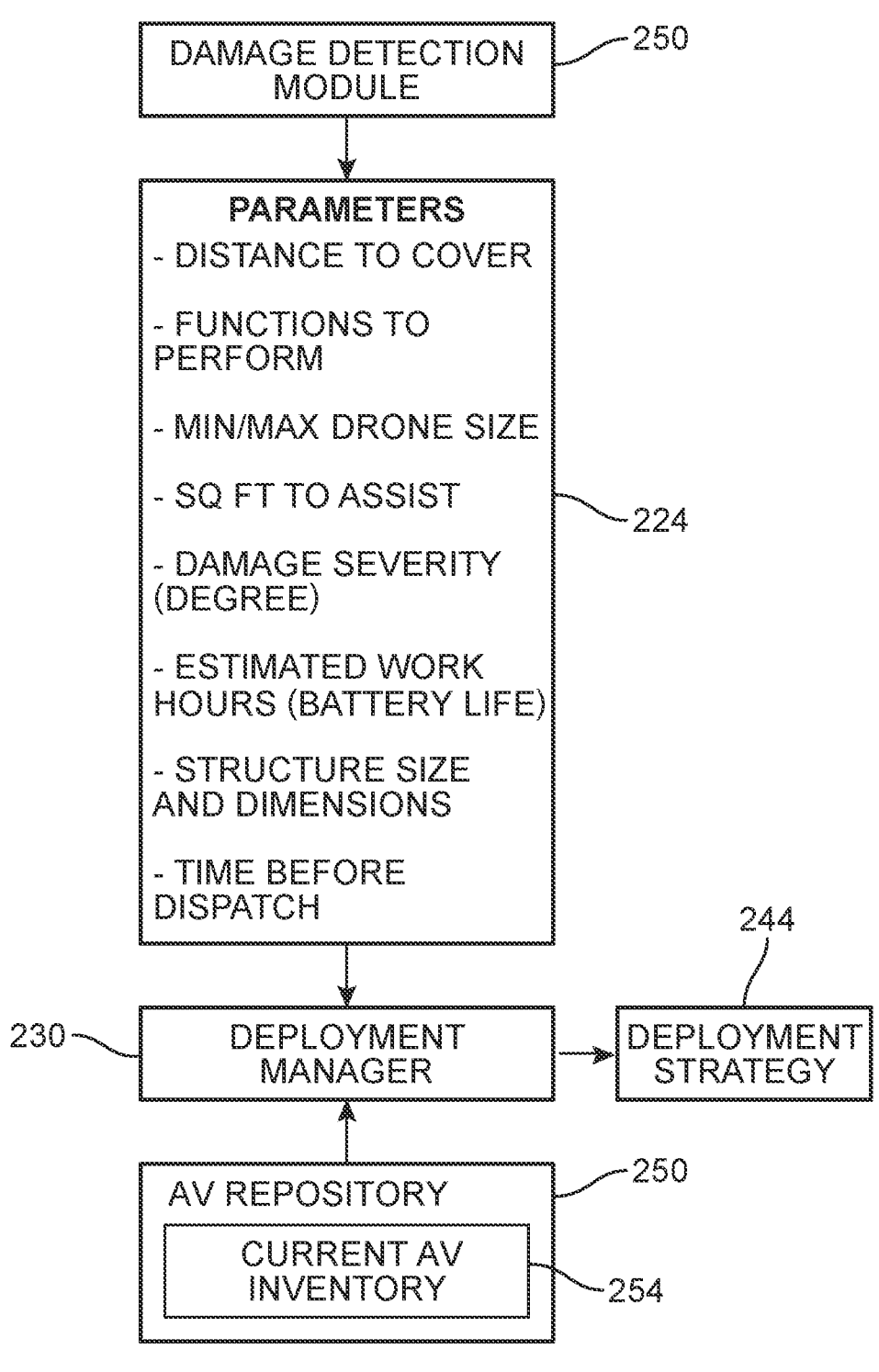
FIG. 2B is a diagram listing some example parameters that can be used in selecting a configuration of an autonomous vehicle party, according to an embodiment.

For example, referring to FIG. 2B, it can be seen that in different embodiments, the damage detection module 220 can be configured to provide one or more parameters that allow the deployment manager 230 to make intelligent recommendations and decisions regarding the make-up of the autonomous vehicles that are to be assigned to a given target and task. Data received from the damage detection module 220 can include or be used by the deployment manager 230 to estimate values for parameters such as (a) distance to cover which measures the traveling time and/or distance that must be covered by the autonomous vehicle (and/or how much battery life is needed for a successful trip there and back again); (b) functions to perform which identifies the desired tasks that should be provided by the designated autonomous vehicles (e.g., image capture, sensor data acquisition, water/mud removal, fire or smoke dispersal, debris transport, back-up power/electricity generator, etc.); (c) min/max autonomous vehicle size that identifies the minimum and/or maximum autonomous vehicle size that would be of use in the given situation, for example for structures that have small openings or large-scale damage that requires large autonomous vehicle capacity; (d) SQ FT to assist indicating the amount of area that needs to be covered or traversed by the autonomous vehicle after it arrives at the target location; (e) damage severity rating indicating how great the damage level appears to be (e.g., low, medium, high); (f) estimated work hours indicating the amount of time that the autonomous vehicles would be expected to operate at the target site; (g) structure size and dimensions describing the structure(s) that require assistance or monitoring at the target location; and (h) time before dispatch indicating how long of a window of time is available before the autonomous vehicles must be deployed, which can be used to recharge autonomous vehicles, or await the return of other autonomous vehicles from another location, thereby increasing the number of autonomous vehicles that are available for the upcoming deployment.

In some embodiments, the deployment strategy can also be based on data indicating availability of autonomous vehicles for the target location, estimated times that the vehicles will require access to refueling and/or recharging stations, and whether the vehicle is terrestrial or airborne. In another embodiment, the system can also consider what the optimal number of batteries are per autonomous vehicle, battery chemistry, the amount of charge in the battery, etc. to help optimize response radii and maximize product time and return-to-waypoint times. For example, in some emergencies, there may be a goal of optimizing for no less than 10% charge and no greater than 90%, while in cases of deeper damage and more time sensitive emergencies, the system may identify a deployment strategy that puts the vehicles at risk of thermal runaway cascade, or other damage. Thus, the system can be configured to receive data regarding holistic energy charge/re-charge considerations relative to existing resource allocation, timing of disaster, etc., data which can then be used to optimize interventions.

In some other embodiments, the deployment manager 230 may also be in communication with the member accounts database 290, which can include information about insured properties in the target area (i.e., properties belonging to members of an insurance plan associated with the damage response system 202). In different embodiments, such data may include property data, primary structure dimensions, primary structure features of interest, reference sensor imagery for comparison, secondary structures associated with property, land attributes, no-fly zones, etc. that describe in more detail the insured property. Secondary structures associated with property can refer to additional structures that are separate from the primary structure but nevertheless should be included during image collection. For example, pools, sheds, MIL house, arbors, garden structures, patios, gazebos, or any other out-building or structure can be identified and its dimensions and location information relative to the primary structure can be applied to better identify potential damage or ensure the autonomous vehicle party includes an autonomous vehicle that can capture images that are complete with respect to a member property.

As a general matter, each structure may be associated with location information that can be transmitted to the autonomous vehicle party via controller 240. As used herein, the term "location information" refers to any kind of information that can be find a geographic location for an object. Location information may include latitude and longitude information. Location information could also comprise a street address. It may be appreciated that location information provided in one format (for example, a street address for a structure) could be converted into another format (for example, a latitude and longitude position). When the location information is specific to a structure (such as a house, office building, or any other structure) the term "structure location" may be used. By obtaining a list of structure locations, the system can capture images of areas that include the structure locations. For example, based on the member information and their associated policy information 294, the deployment manager 230 may assign a specific type of autonomous vehicle to the target area that is configured to perform repair work on a particular structural characteristic that is known and has greater value for that property. In other words, there may be primary structure features of interest—physical features of the structure that may be tagged as being of particular value or significance to the objectives of the mission. In such cases, the proposed autonomous vehicle party generated by the neural network 234 or other autonomous vehicle selection algorithm can include specialized autonomous vehicle selections that would accommodate the needs identified in the member accounts database. In some embodiments, the system These values, along with up-to-date information regarding current autonomous vehicle inventory 254 for the autonomous vehicle repository 250 will be inputted into the deployment manager 230 to generate a deployment strategy 244. Returning to FIG. 2A, a neural network 234 or other machine learning model is configured to receive these inputs and determine which configuration of autonomous vehicles would be most likely to fulfill the requirements and perform the needed response-tasks of the target area. In some embodiments, an autonomous vehicle assignment generator 232 receives the model's decision and communicates with the autonomous vehicle fleet database 252 to update the autonomous vehicle schedules and assignments. Once an autonomous vehicle configuration has been assigned, the controller 240 can provide instructions to the selected autonomous vehicles via communication system 242.

In some embodiments, the autonomous vehicle transport vehicle manager 282 can represent a mobile repository that loads a mixed assortment of autonomous vehicles into one or more truck beds as cargo or other mobile storage and drives or flies near or into the target area. For example, a transport vehicle can be configured to provide an initial transport of autonomous vehicles to an area near the affected structure. The transport vehicle can include various types of autonomous vehicles (e.g., a mud treatment autonomous vehicle). In some embodiments, these autonomous vehicles may be operated remotely. In some embodiments, these autonomous vehicles may be operated autonomously. Each autonomous vehicle will be provided with information about the target destination (e.g., a house). As the truck or helicopter or other delivery carrier arrives, the deployment manager will select an autonomous vehicle party from its cargo of autonomous vehicles. In some embodiments, each autonomous vehicle can share sensor data (and/or information generated by its onboard computing device based on collected sensor data) with accompanying autonomous vehicles in order to generate a more cohesive, efficient approach to the damage response efforts.

In some other embodiments, the transport vehicle can comprise either a ground-based or aerial-based vehicle. In addition, in some embodiments, the transport vehicle may be disposable. In some embodiments, the transport vehicle can be launched from orbit or from an aerial glider or platform, or an in-ground or below-ground-based location. In different embodiments, the transport vehicle can release its autonomous vehicle payload and then itself serve direct functions similar to its deployed autonomous vehicles. In some embodiments, the transport vehicle—being substantially larger than the deployed vehicles in the party—can provide heavy lift operations capabilities and serve other functions such as extraction or movement of objects.

In one embodiment, the autonomous vehicle transport vehicle manager 282 is accessed by or included in the control center computing system onboard the transport vehicle. The computing system can, in one example, include a local version of the deployment manager 230 which will determine the optimal configuration of autonomous vehicles to dispatch from its own truck bed/container, while in other embodiments, the autonomous vehicle transport vehicle manager 282 can communicate with deployment manager 230 over a network. The autonomous vehicles can then be deployed from the current location of the transport vehicle, rather than be required to first travel from the remote repository to the target area. In addition, the vehicles that are located in the target area, including not only these autonomous vehicle transport vehicles, but vehicles 292 that are registered in the member accounts database 290, can be configured to share on-the-ground real-time sensor data with the damage response system 202 to greatly improve the accuracy of the damage assessment performed by the damage detection module 220. Other types of on-site sensor data 270 can also be used; for example, computer readable medium may include instructions for determining that a user/building within the geographic target region has been impacted by flooding based on the on-site sensor data 270. In some embodiments, information from various pre-existing networks may be utilized to determine the status of geographic regions following a disaster. For example, networks such as traffic lights, utilities info, road closures, service providers (cable, internet, etc.), and other sources can be considered. Also, information from Internet of Things (IoT) sensors associated with the impacted structures can be reviewed. This information can be used to determine disaster response strategies. Information from vehicle diagnostics and reporting systems can also be used.

Figure 3:
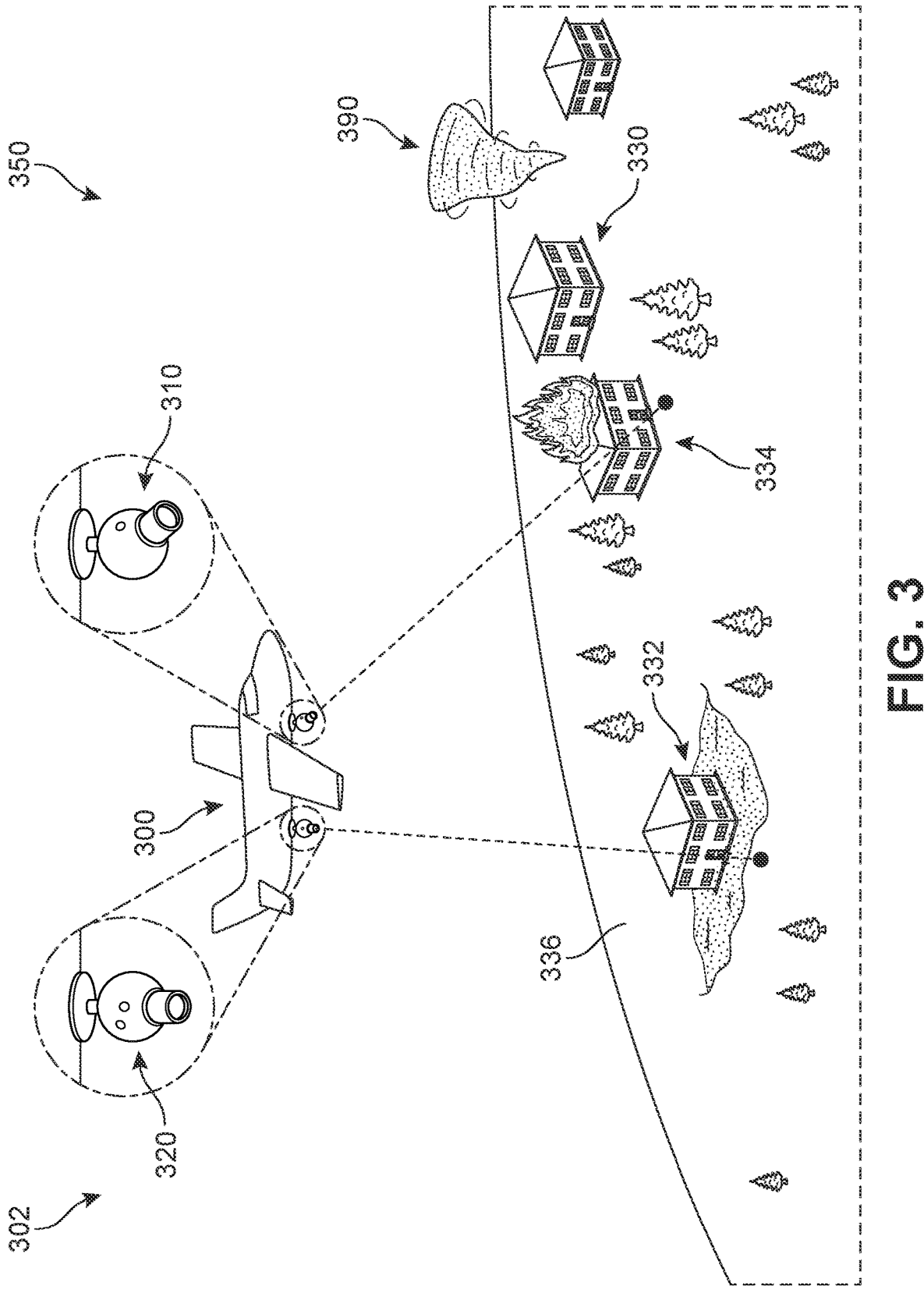
FIG. 3 is an example of a process of capturing data of a disaster-impacted region, according to an embodiment.

Referring now to FIG. 3, an example of an initial data collection stage 302 is depicted, whereby an aerial autonomous vehicle or satellite 300 with image capture devices (e.g., a first camera 302 and a second camera 304) is shown traveling over a second impacted area 336 including several structures. Following a tornado 390, it can be seen that a fire has engulfed a first structure 332, while flooding surrounds a second structure 334 and a third structure 330. The satellite 300 captures a series of images from its bird's-eye view, which are then transmitted to and received by the damage detection module of the damage response system (not shown in FIG. 3).

Typically, in this scenario, the residents have already evacuated their homes. As noted earlier, the effects of floodwaters, fires, mud, etc. on the exterior and interior surfaces of the home can occur rapidly and a timely response can mean the difference between a simple remedy or a complete loss. Thus, the damage that has occurred will continue to cause deterioration of different parts of the building if no active repairs or preventative measures can be taken without human presence. Indeed, it can be appreciated that human entry on the property at this time is fraught with risk. However, the use of unmanned autonomous vehicles can initiate clean-up without a human presence. At a subsequent second time, as will be discussed below, and in accordance with the proposed embodiments, one or more autonomous vehicles can be selected and then be deployed in response to the conditions produced by the disaster and detected by the damage response system.

Figure 4:
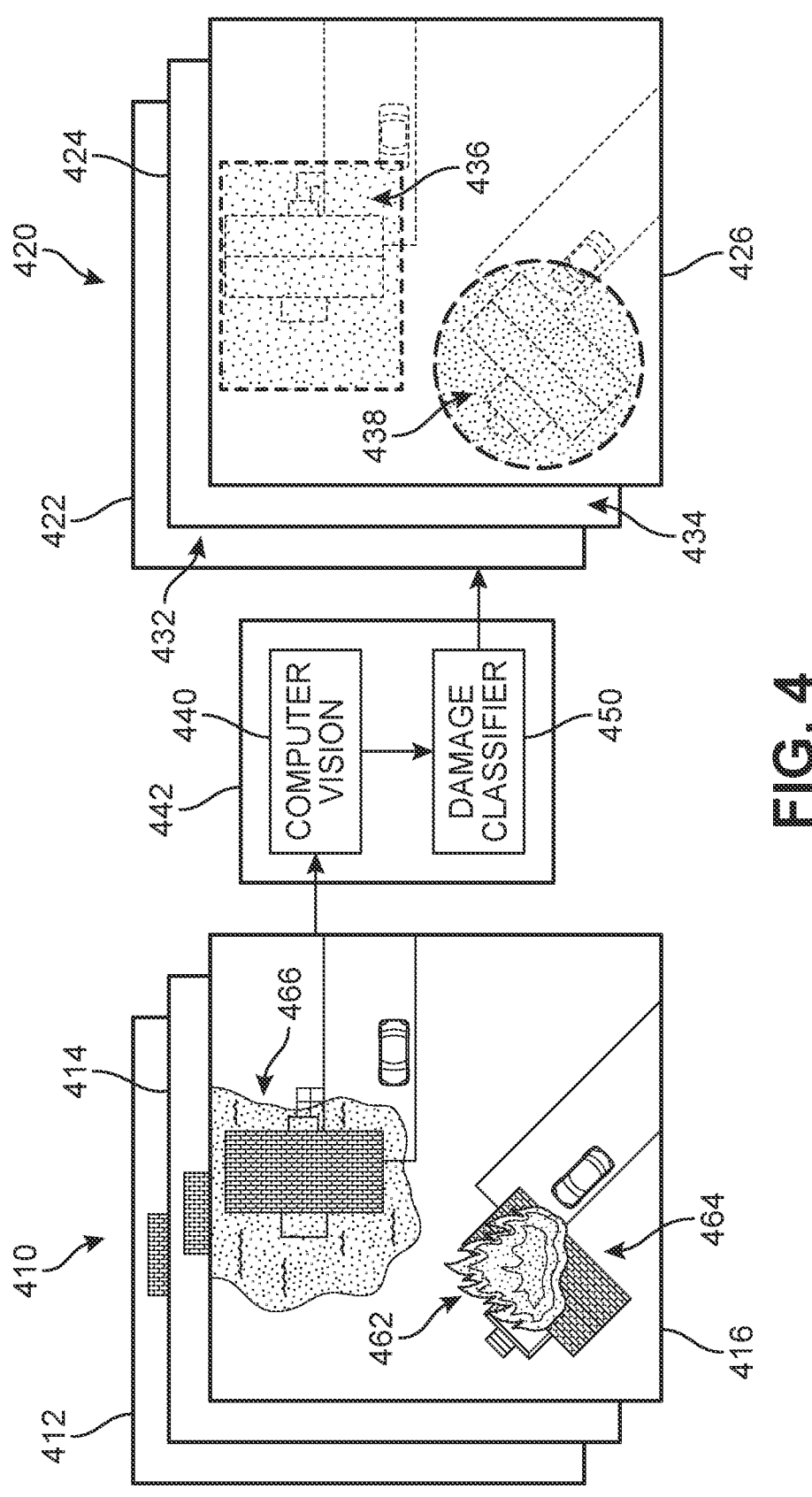
FIG. 4 is schematic illustration of a process of classifying damage in aerial images, according to an embodiment.

In FIG. 4, a first set of image data ("first image set") 410—in this case including a first image 412, a second image 414, and a third image 416—are shown being submitted to a damage detection module 442. Specifically, a computing system may retrieve image information from a satellite images database. For example, the computing system could access a satellite images database over a network. In order to determine which images to use, a system may look up the address of the premises, which may generally be stored by the provider on a database of computing system.

In different embodiments, one or more computer vision module 440 including machine vision algorithms may be applied to identify an object in the digital image. In some embodiments, the damage detection module 442 may include computer vision algorithms such as image analysis algorithms that may use a feature detector or a combination of detectors. For example, a texture detector and edge detector may be used. If both specific texture and specific edges are detected in a set of images, then an identification may be made. One example of an edge detection method includes the Canny™ algorithm available in computer vision libraries such as Intel™ OpenCV. Texture detectors may use known algorithms such as texture detection algorithms provided by Matlab™

In different embodiments, the input (e.g., first image set 410) is cleansed and normalized. In one embodiment, the image processing algorithms perform compression, artifact correction, noise reduction, color corrections, geometric corrections, imager non-uniformity correction, etc., and various image processing enhancement operations on the image content. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms.

In some embodiments, image processing may also include machine learning techniques that can be used to discriminate between features and to identify objects, for example via image recognition and object detection software. Such techniques may also include machine vision algorithms that perform, among other operations, symbol and logo recognition, general shape recognition, as well as object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), Yolo Framework—Yolo1, Yolo2, Yolo3, and SSD.

Furthermore, damage classifier 450 can be trained to work in conjunction with computer vision module 440 to apply machine learning techniques, such as deep learning that includes classification, clustering, and/or other techniques, such as techniques that employ deep learning neural networks for pattern recognition within the image data, or to perform other types of analysis. For example, a neural network and/or classification technique may be used to train a model that is a classifier and that is useable to detect and rate different types and levels of damage. Some suitable artificial intelligence software is available for public access through open source AI platforms like Caffe, Torch and Theano who provide businesses access to powerful neural networks for processing of their information by AI techniques like deep learning, reinforcement learning and logistic regression, as well as TensorFlow, OpenAI, and BigSur. Moreover, in some implementations, the process may employ a damage estimation engine that uses ML techniques to generate repair and/or recovery response information. In some embodiments, such techniques may include supervised and/or unsupervised ML techniques. In some implementations, the estimation engine may employ a ML-based model that is trained using training data that includes damage estimates and identifiers. Accordingly, the estimation engine may be trained over time to develop a more accurate damage description.

It should be appreciated that in different embodiments, one or more machine learning algorithms for classifying objects in images can differ in cases where the images are satellite images versus ground-based images. This difference in appearance is a result of the different perspectives (and distances) of the ground-based and aerial imaging and other sensor data collection methods. It may therefore be appreciated that while similar machine learning algorithms may be used to identify damage from ground-based and aerial images, as well as other aerial sensor data, the algorithms may be trained differently and may converge on different learning parameters.

In different embodiments, once the system determines if a specific type of damage has been detected, it may output a damage classification parameter that corresponds to the damage type and level. As shown in FIG. 4, following processing by the damage detection module 442, a damage assessment can be generated that identifies the various types of damage (e.g., fire, wind, flood, debris, hail, etc.). Some examples of the model are described in U.S. patent application Ser. No. 16/989,375 (Plumsea Ref No. 171-1327) filed on Aug. 10, 2020 to Jess W. Gingrich, et al. and titled "Intelligent System and Method for Assessing Structural Damage Using Aerial Imagery", the disclosure of which is hereby incorporated by reference in its entirety. In the example of FIG. 4, an output 420 is represented as a first classified image 422, a second classified image 424, and a third classified image 426, which include bounding boxes that have been overlaid on the images of the first image set 410 to show where structures or other objects of interest have been detected, as well as identification of the varying types and/or degree of damage. For example, a first type of damage 332 (e.g., hail) may have been identified in the first classified image 422, a different, second type of damage 434 (e.g., floodwater) may have been identified in the second classified image 424, and a third type of damage 436 (e.g., fire) as well as a fourth type of damage 438 (e.g., debris) may be identified in the third classified image 436. In addition, other labels or supplemental information can be added to or otherwise annotated to the data to indicate the severity of the damage.

Another way in which the determined conditions may be communicated to others is via the preparation and distribution of a map showing the localities in which electrical power is unavailable, or flooding, fire, debris, or other damage has been detected. For example, based on the information received and processed by the damage detection module, the system may optionally prepare a map illustrating conditions in the monitored geographic area. Information regarding multiple different conditions may be indicated on the map. In some embodiments, the information may be provided in layers. The layers may be selectable by the user as to which layers of information are shown on the map at a given time.

In different embodiments, the damage detection module can be configured to generate a high-level map depicting the locations where major damage has occurred and the type of damage detected. One example of this output is shown as a regional map 500 in FIG. 5. Accordingly, in some embodiments, computer readable medium for the system may include instructions for determining a boundary of an area in which electrical power is unavailable or other damage has been found, and preparing a map that illustrates the boundaries. For purposes of illustration, the regional map 500 shows land areas where flood has been detected (represented by a water symbol), where power outages have been detected (represented by a power outage symbol), and where fire or its aftereffects have been detected (represented by a fire symbol). In cases where damage has been detected but the source is unknown, an unknown symbol (here represented by a question mark) may be presented.

Figure 5:
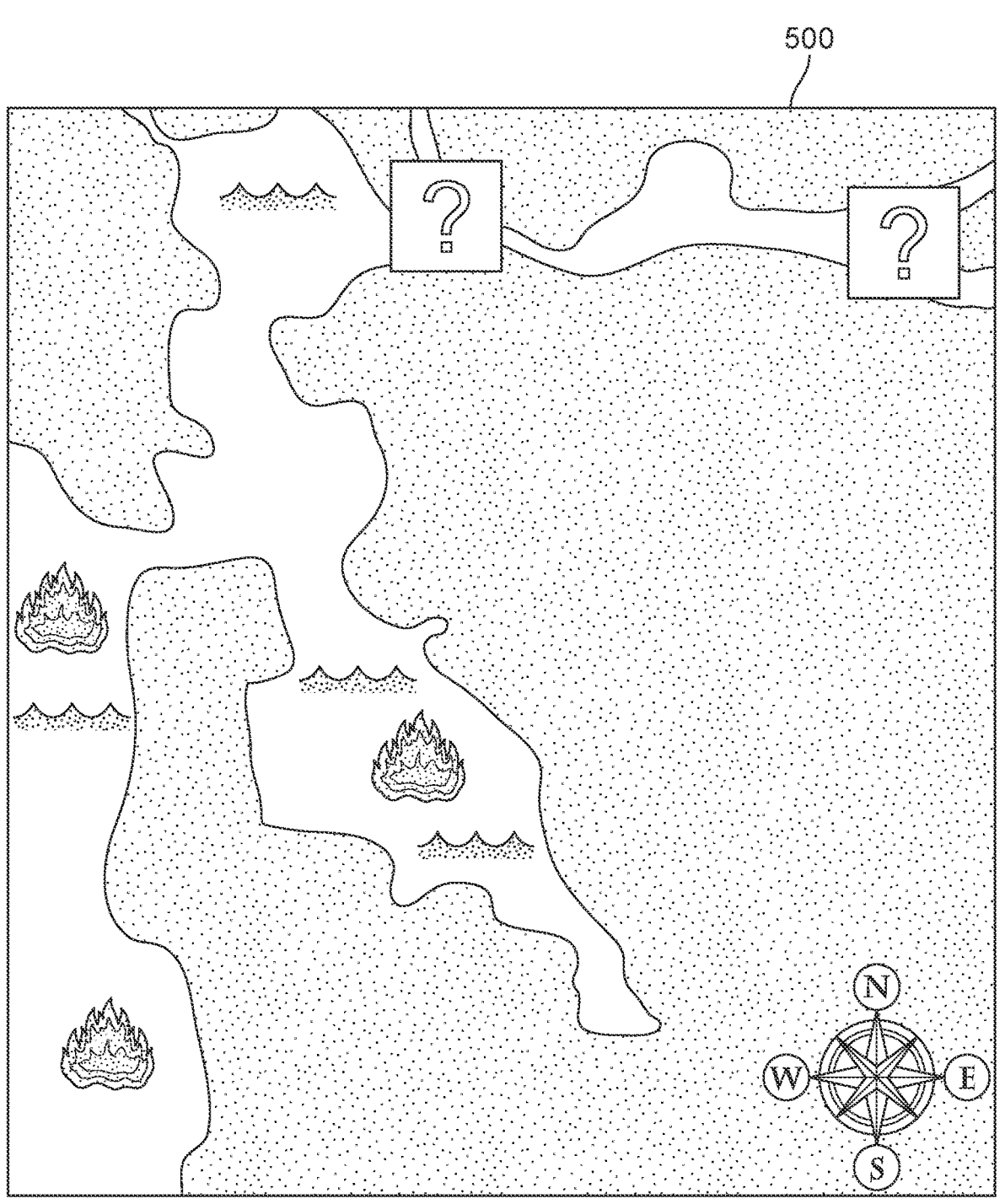
FIGS. 5 and 6 are depictions of outputs from a damage detection module of the damage response system, according to an embodiment.

In some embodiments, the damage assessment can further include more detailed damage identifications and estimates in order to allow the damage response system to better designate which/how many autonomous vehicles to dispatch to a given location. For example, in FIG. 6, a smaller section of the impacted region that was shown in FIG. 5 is now presented in a neighborhood map 600, including more specific damage details for individual streets and buildings. In addition, the neighborhood map 600 includes damage clustering—for example, a first neighborhood 610 has been primarily impacted by a mix of fire and flooding, a second neighborhood 620 has been primarily impacted by fire, and a third neighborhood 630 has been primarily impacted by floodwater. This level of discrimination can be used by the damage response system to make highly accurate autonomous vehicle deployment decisions (see FIGS. 8 and 9).

As noted earlier, in some embodiments, additional or alternative data sources can be used to provide input to improve the damage characterization for a given region. Some embodiments may be configured so that either ground-based images or satellite-images could be used. In some cases, a system may check to see if ground-based images are available. If not, the system may proceed to using satellite images. For example, in some cases, the system can first check to see if satellite images are available before using ground based images. If so, the system proceeds to retrieve and analyze images from the ground-based images to determine if damage is present. Otherwise, the system retrieves images from a satellite images database and analyzes those images to determine if damage is present. Some embodiments may utilize information from both ground-based images and satellite images to detect damage. By using two different data sources, the results of the analysis may be more reliable.

Figure 7:
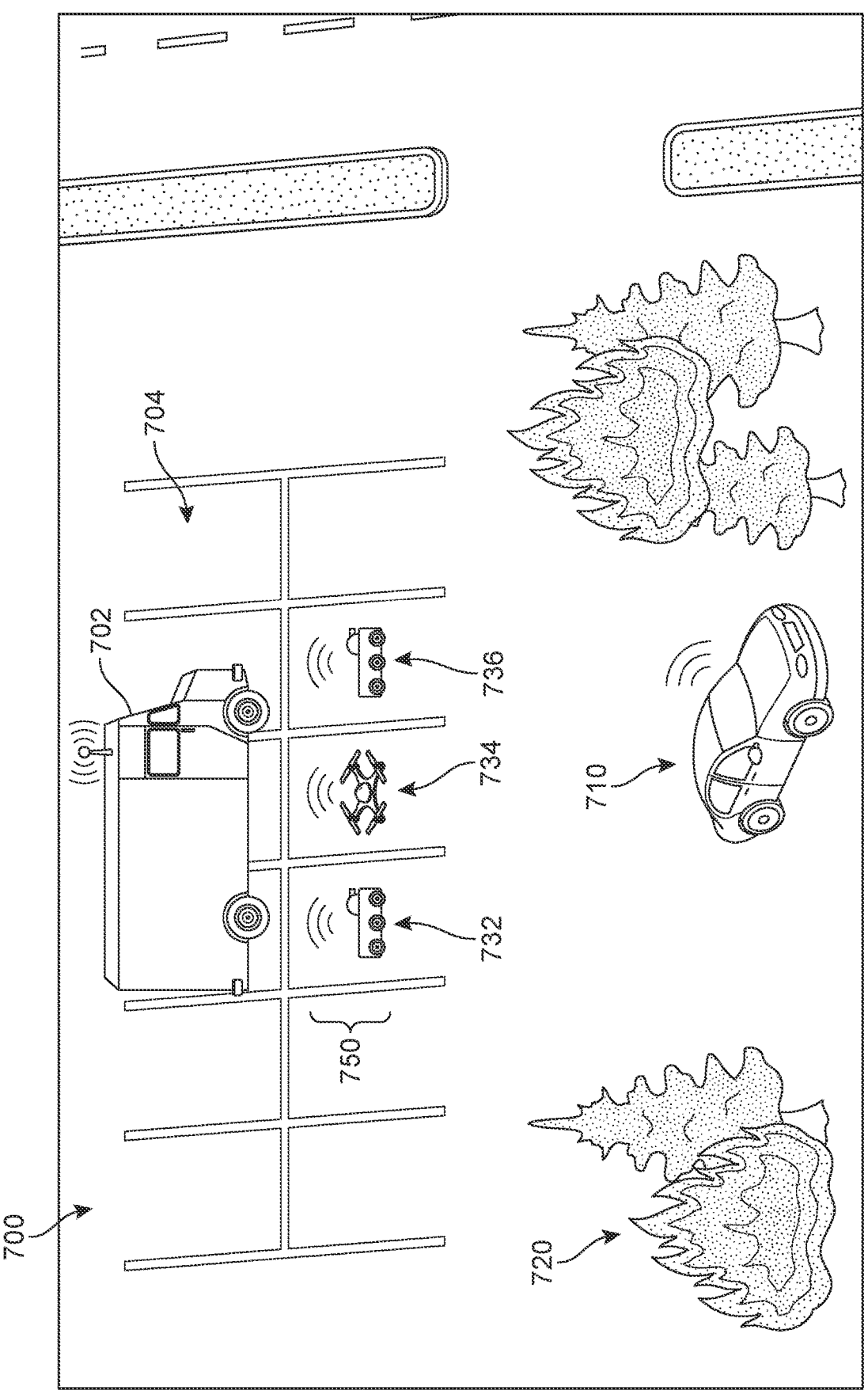
FIG. 7 presents an example in which a transport vehicle carrying a group of autonomous vehicles has arrived at a target location and generates an autonomous vehicle party assignment based on on-site sensor data, according to an embodiment.

FIG. 7 illustrates an example of an approach in which ground-based images or sensor data can be collected and made available to the system. In this example, a transport vehicle 702 has arrived at a first location 700 that has been impacted by a natural disaster. The transport vehicle 702 was pre-loaded with a mini-fleet 750 comprising a plurality of autonomous vehicles such as a land-based autonomous vehicle 732, an aerial autonomous vehicle 734, and a water-capable autonomous vehicle 736, as well as others not shown (still loaded in the transport vehicle 702). These and other autonomous vehicles may be stored in the transport vehicle 702 for some time prior to a disaster (in preparation of a disaster) or in response to an approaching disaster-event or its occurrence. In other words, the transport vehicle 702 may represent a type of mobile repository for the autonomous vehicle fleet. Upon arrival at the first location 700, the transport vehicle 702 can monitor the on-the-ground and real-time conditions in the surrounding area and submit this data to a local damage response system or to a remote damage response system via a network connection. The damage response system can then determine an optimal set of autonomous vehicles that should be deployed. For example, upon detecting fire 720, the damage response system can trigger deployment of fire-treatment autonomous vehicles loaded on the transport vehicle 702 that can reduce the spread and/or severity of the flames. In yet another example, vehicles such as a member vehicle 710 present in the first location can be configured to automatically transmit sensor data to the remote damage response system that can be used to more precisely pinpoint the kind of response that would best serve the location.

Figure 8:
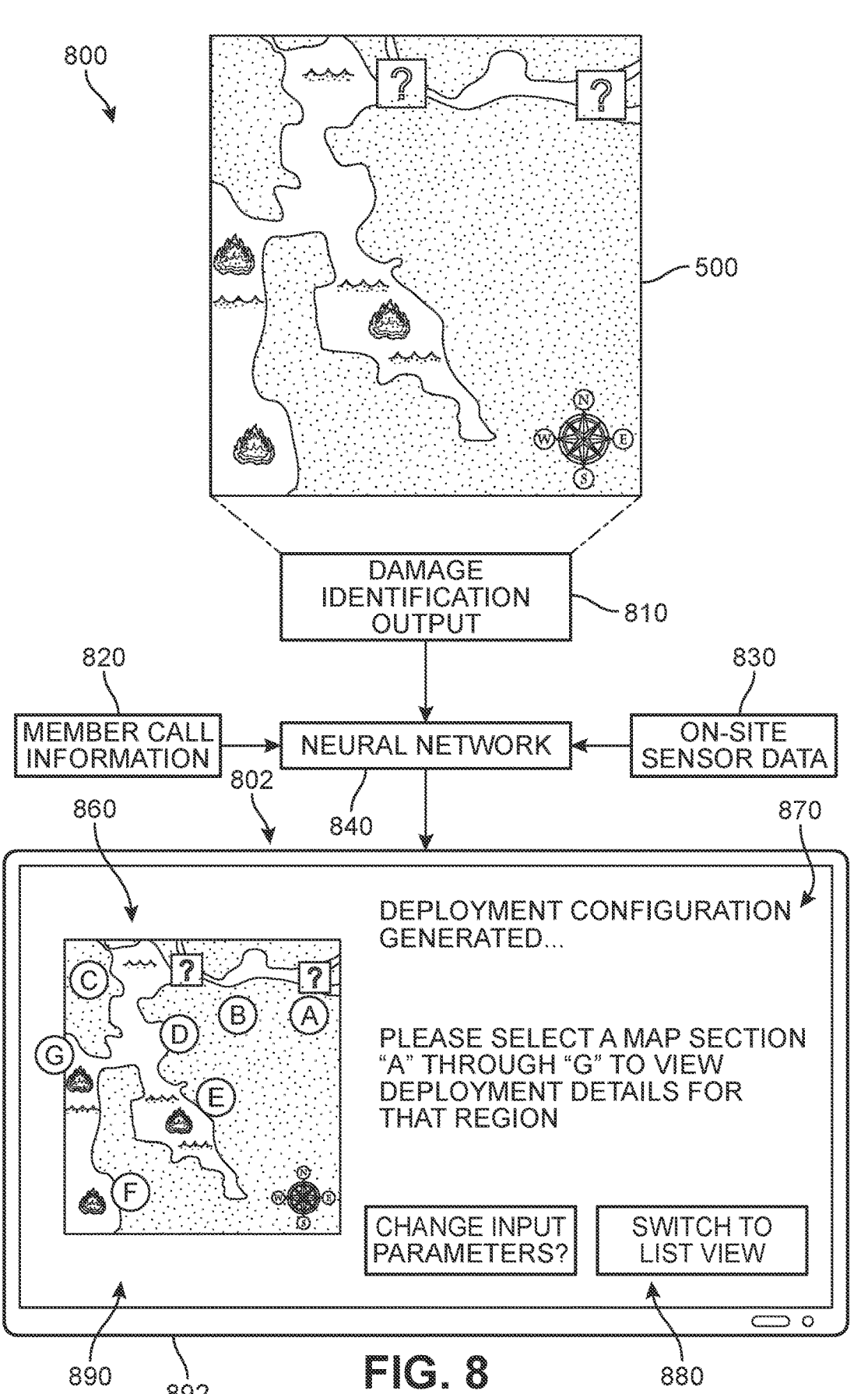
FIGS. 8 and 9 are schematic diagrams depicting an autonomous vehicle selection and assignment process to different areas in a disaster-impacted region, according to an embodiment.
Figure 9:
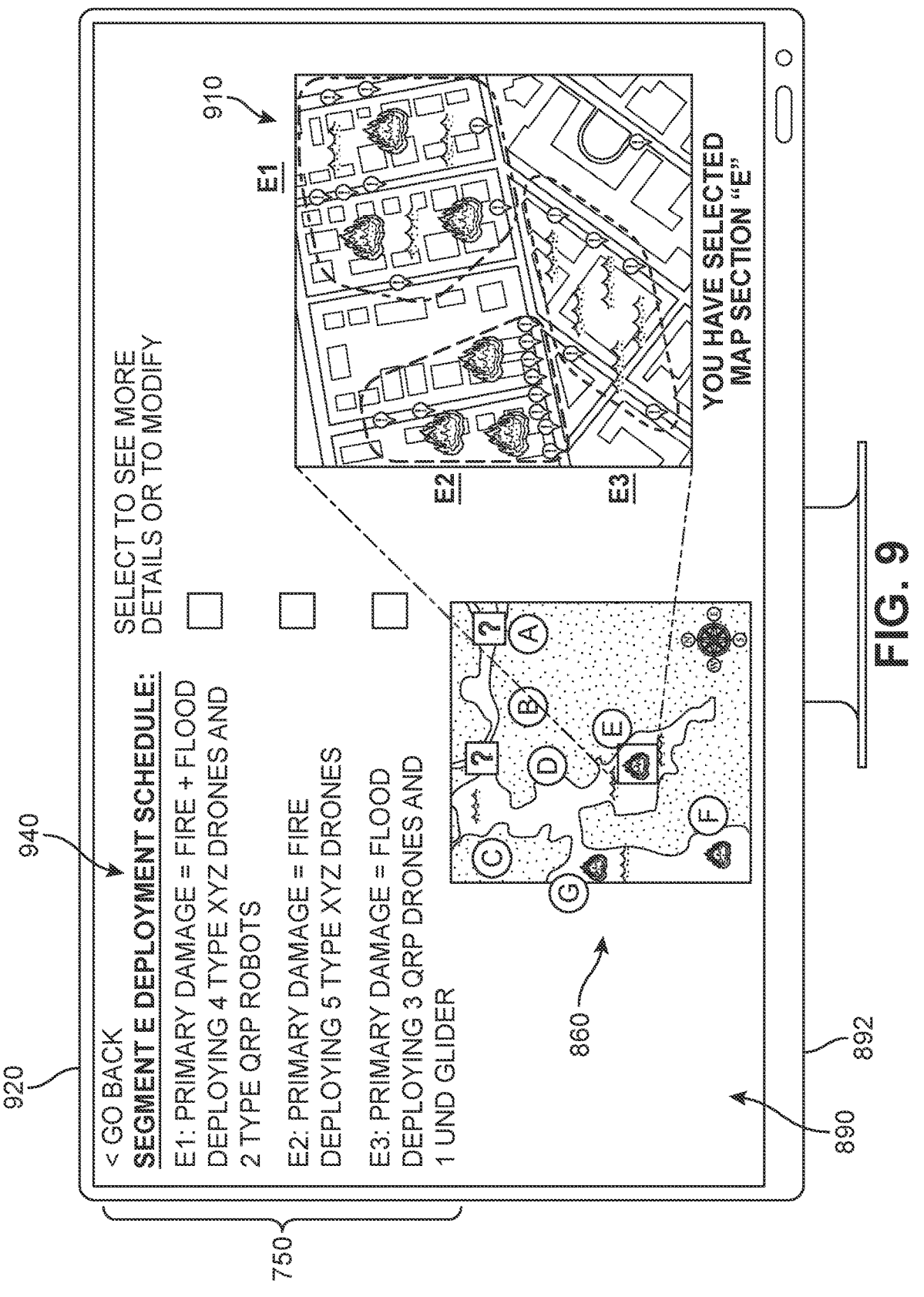

Referring now to FIGS. 8 and 9, additional details regarding the autonomous vehicle deployment process are shown. In the embodiment of FIG. 8, the output (shown as regional map 500) of damage detection module is now submitted to a neural network 840, along with any member call information 820 (see FIG. 2) and on-site sensor data 830 (see FIG. 7). As discussed in FIG. 2, the neural network 840 is configured to determine the optimal autonomous vehicle deployment assortment (a mixed pattern and number of autonomous vehicles as an autonomous vehicle deployment configuration) that should be dispatched to a given location to best serve the needs of that location, forming an autonomous vehicle party. An example of a deployment strategy 802 is then depicted via a user interface 890 presented on a device display 892. The user interface 890 includes an annotated regional map 860 with selectable options to view each location's determined deployment configuration. For example, in FIG. 8, the letters "A", "B", "C", "D", "E", "F", and "G" have been overlaid on the map to indicate the specific sections that have been assigned a tailored autonomous vehicle configuration. The user interface 890 further presents message 870 ("Deployment configuration generated . . . Please select a map section "A" through "G" to view deployment details for that region."). In some embodiments, additional selectable options 880 can be provided, allowing the end-user to re-run the process (e.g., "change input parameters") or to view the resulting deployment assignments in a list or other view ("e.g., "switch to list view").

Figure 6:
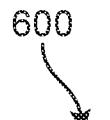

In FIG. 9, the end-user has selected the map section "E", which has triggered the presentation of a zoomed-in portion of the map corresponding to that area, along with the damage details for that area (see FIG. 6). Furthermore, the selected map section is now shown with the automatically generated autonomous vehicle deployment strategy for each neighborhood that was identified as damaged by the system. More specifically, the user interface 890 now lists a deployment schedule 920 for the selected area, which for purposes of illustration includes three stages: (E1) Primary Damage=Fire+Flood/Deploying 4 Type XYZ Autonomous vehicles and 2 Type QRP Robots; (E2) Primary Damage=Fire/Deploying 5 Type XYZ Autonomous vehicles; and (E3) Primary Damage=Flood/Deploying 3 QRP Robots and 1 UND autonomous vehicle. Each autonomous vehicle type (e.g., "XYZ", etc.) will be equipped with various equipment, devices, and sensors that allow it to perform a specific task or set of tasks. Some examples include monitoring autonomous vehicles (configured to record data about the damage), recovery autonomous vehicles (configured to extract valuables or other items from the area), and repair autonomous vehicles (configured to perform operations that can contribute to repair efforts).

Each of these types can also include sub-specializations, based on the type of damage detected (fire, flood, flooding, etc.). Typically, autonomous vehicles will include onboard sensors such as a gyroscope, an altimeter, and an accelerometer. In different embodiments, sensors may also include a camera for capturing images and other light-based data for receipt by the image processing system. Camera may comprise any kind of camera, including any kind of digital camera, as well as a camera configured to capture infrared, x-ray, ultraviolet, and visible light signals. Other sensors can include thermocouples, thermistors, humidity sensors, $CO_2$ sensors, Geiger counters, gravimeters, EMF or Tri-Field sensors, magnetometers, alpha/beta particle detectors, neutron detectors, particle counters (e.g., quantity <2.5 micron or <10 micron), lidar, sonar, radar, ionic species detectors, gas chromatographs, volatile organic compounds detector (VOC), mass spectrometers, Raman spectrometers, UV and IR spectrometers, and EMF/light sources (e.g., lasers, IR, etc.) to support stimulated spectroscopic techniques and/or improved visualization of targets, etc.

As a non-limiting example, a "moisture-monitoring" autonomous vehicle can carry one or more sensors such as (1) sensors that employ electrical tomography in the spatial analysis of moisture in porous building materials (such as bricks and cement) of various thicknesses, (2) sensors that use gamma-rays and X-rays to determine moisture diffusivity, (3) sensors including dielectric and microwave meters to analyze moisture content, (4) sensors that use laser scanning, involving a procedure to automatically show where moisture appears in a building and assess moisture saturation and movement in building materials, respectively, (5) sensors that apply InfraRed Thermography (IRT) and electrical resistance measurement for in situ assessment of superficial moisture, (6) sensors that use Ground-Penetrating Radar (GPR) for internal moisture detection, (7) sensors using the near-infrared (NIR) spectrum via a non-contact, light-reflection type of moisture sensor that is based on a water molecule's light-absorbing characteristics the near-infrared (NIR) spectrum, and/or other sensors that can collect data relevant to the detection of moisture. Thus, the moisture tracking system can employ a wide range of sensors to accurately identify moisture content levels and the spread of the moisture across different materials and surfaces. In some embodiments, the moisture tracking system can also include a model that can predict the path of moisture in order to recommend a preemptive treatment of areas that are likely to be impacted if the moisture ingress is not addressed.

In different embodiments, for each of the deployment stages, additional details (such as secondary damage data, or specific autonomous vehicle information) can be access by selection of options adjacent to each item. Once the deployment strategy for a given region has been created, the system can be configured to automatically execute the strategy and cause the selected autonomous vehicles to be dispatched per the requirements provided by the system. Thus, assistance can be quickly and expeditiously rendered to each neighborhood in a disaster-impacted region in an approach that is commensurate with the impact the disaster has had on the different sections that comprise the region. Some areas will receive more autonomous vehicles, some fewer, depending on the damage that has been detected in those areas. Similarly, some areas will receive autonomous vehicles configured to perform one type of service or function, while other areas will receive autonomous vehicles configured to perform another type of service of function, based on the damage type detected in those areas. By fine-tuning the deployment configuration in such a way, the autonomous vehicles will be more efficaciously utilized, and there can be a significant decrease in response time and mis-applied resources.

In different embodiments, the autonomous vehicles that are dispatched based on the automatically generated deployment strategy can be manually controlled or autonomously controlled. In some cases, a controller associated with the damage response system may communicate with the autonomous vehicles to control their operation and/or to receive the images or other sensor data obtained by the autonomous vehicles. In some embodiments, a global positioning system (GPS) navigation system may be utilized to fly the autonomous vehicles to the desired location and back. The controller may be configured to dispatch and command the autonomous vehicles to complete reconnaissance and/or recovery/repair trips to a specific disaster area. Accordingly, computer readable medium may include instructions for receiving this location information from any of a variety of sources and completing the autonomous vehicle mission to the designated location.

Simply for purposes of example, one scenario in which an embodiment of the proposed damage response system can be used may include a flood response and/or mud management autonomous vehicle dispatch event that is configured to automatically deliver mud treatment devices to buildings impacted by a water-related disaster, particularly locations where people have evacuated their homes. The damage response system can determine a disaster has caused floodwater and/or mudflow to penetrate a region, and in response automatically prepares and triggers deployment of a specially selected autonomous vehicle party that is designed to serve the designated area. In some embodiments, the damage response system is in communication with the autonomous vehicle repository, as well as disaster information providers. As used herein, the term "disaster information provider" refers to any entity that may transmit information about pending or ongoing disasters. As an example, the Emergency Alert System (EAS) is a federal system used in the United States to provide emergency notifications, including emergency weather alerts for specific geographic areas. In other embodiments, disaster information providers could include any other organization (private or public) configured to deliver information about pending or ongoing disasters or emergencies. Alerts can be provided over any communication mode, including short messaging service (SMS) based texts, emails, or other suitable communication modes. The damage response system may also communicate with a Geographic Information System (GIS) provider, for example to retrieve maps and other related geographic information from GIS provider. In some embodiments, the system may also communicate with weather and traffic providers and receive real-time or near real-time information about weather and traffic in specific geographic locations. In some cases, real-time traffic information may include information about road closures in an area. In one embodiment, the system communicates with residents through one or more devices. As an example, a resident device owned by a resident in a particular geographic region may run an application for communicating information between the system and a resident. Resident device could include computing resources such as processors, memory, and a navigation system for detecting a current GPS location. Such devices may comprise mobile phones, tablets, smart watches or other mobile devices.

In different embodiments, affirmative data and reports regarding the presence of floodwater are beneficial to determining which buildings may require an expedited clean-up in a given geographic area. Data and reports that positively indicate flooding are definitive, whereas the data and reports indicative of evacuations and absence of persons in the area can be inconclusive. As a specific non-limiting example, the system may receive Internet of Things information by a house that has been impacted by flood water. In some embodiments, the house may be equipped with one or more moisture sensors configured to detect the onset of flooding and the retreat of flood water. The system may be configured to receive data from these and other such on-site sensors. Accordingly, in some embodiments, the information indicative of the status of moisture and mud levels for which computer readable medium includes instructions to receive includes information regarding operating status of Internet of Things devices in the geographic region.

In some embodiments, the information indicative of the status of moisture and mud for which the computer readable medium includes instructions to receive includes information regarding emergency telephone calls (e.g., 911 calls). Emergency call records may include reports of floodwater and/or mudflow in the caller's home or in buildings nearby. The system, or a third party system, may analyze the information received regarding possible mudflow contamination, and may make determinations regarding the conditions in the geographic region from which the information is received. Once the system 202 determines a location has experienced a flood or mudslide event, a triggering event can be understood to have occurred. In response, the system 202 will identify the autonomous vehicles needed. This information, along with a control signal, is then automatically generated and transmitted to the autonomous vehicle repository nearest to the identified target location.

Some examples of these autonomous vehicles and autonomous vehicle deployment systems that can be utilized by embodiments of the damage response system disclosed herein are described in further detail in U.S. Patent Application No. 63/363,659 (Plumsea Ref. 171-1560) filed on Apr. 27, 2022 and titled "Emergency Deployment of a Drone-Based Dehumidifier" to Carlos JP Chavez, et al., U.S. Patent Application No. 63/363,661 (Plumsea Ref. 171-1561) filed on Apr. 27, 2022 and titled "Emergency Deployment of a Drone-Based Flood Control System" to Carlos J P Chavez, et al., U.S. Patent Application No. 63/250,526 (Plumsea Ref. 171-1410) filed on Sep. 30, 2021 and titled "System and Method for Assessing Structural Damage in Occluded Aerial Images" to Yangqiu Hu, et al., U.S. patent application Ser. No. 17/513,373 (Plumsea Ref. 171-1417) filed on Oct. 28, 2021 and titled "Local Flight Path Navigation for Drone Deliveries" to Bradly Jay Billman, et al., U.S. patent application Ser. No. 17/504,950 (Plumsea Ref. 171-1486) filed on Oct. 19, 2021 and titled "Flight Path Optimization for Aerial-Based Damage Assessment" to Donnette L. Moncrief Brown, et al., U.S. Patent Application No. 63/362,254 (Plumsea Ref. 171-1558) filed on Mar. 31, 2022 and titled "Emergency Deployment of Solar Panels Using Drones" to Carlos JP Chavez, et al., U.S. Patent Application No. 63/367, 141 (Plumsea Ref. 171-1619) filed on Jun. 28, 2022 and titled "Drone-Based Dehumidification Treatment Device" to Carlos JP Chaves, et al., U.S. Patent Application No. 63/367, 140 (Plumsea Ref. 171-1620) filed on Jun. 28, 2022 and titled "Drone-Based Mud-Softening Treatment Device" to Carlos JP Chaves, et al., and U.S. Patent Application No. 63/367,141 (Plumsea Ref. 171-1619) filed on Jun. 28, 2022 and titled "Drone-Based Dehumidification Treatment Device" to Carlos JP Chaves, et al., the disclosures of which are incorporated by reference in their entirety. For purposes of this application, a triggering event refers to an event or sequence of events that matches a pre-selected condition and will cause a signal to be transmitted from the damage response system to one or more autonomous vehicle systems for purposes of providing emergency damage management assistance.

In different embodiments, the number of autonomous vehicles and/or types/models of autonomous vehicles that will be selected to respond to the detected damage will vary based on the number of buildings and/or damage levels and types estimated by the system. In another example, there may only be a limited number of autonomous vehicles in the repository, and so only the autonomous vehicle(s) available can respond.

FIG. 10 is a flow chart illustrating an embodiment of a method 1000 of providing services to a disaster-impacted location. The method 1000 includes a first step 1010 of automatically determining, at a damage detection module, that a first type of damage has impacted a first location, and a second step 1020 of automatically generating, at the damage detection module, a first damage assessment including details regarding the first type of damage. A third step 1030 includes receiving, at a deployment manager and from the damage detection module, the first damage assessment, and a fourth step 1040 includes automatically selecting, at the deployment manager and based on the first damage assessment, one or more autonomous vehicles (AVs) available in a first autonomous vehicle repository to include in an autonomous vehicle party for deployment to the first location. A fifth step 1050 includes transmitting, from a controller, instructions to the selected one of more autonomous vehicles for deployment to the first location.

In other embodiments, the method may include additional steps or aspects. In one example, the method also includes steps of receiving, at the damage detection module, a plurality of aerial-based sensor datasets, or "aerial sensor data" (e.g., data collected from the air), such as images, of the first location, and employing a deep learning damage classification model using the plurality of aerial sensor data to identify the first type of damage. In some embodiments, the first autonomous vehicle repository is selected from a plurality of autonomous vehicle repositories based on its being nearest to the first location. In another example, the method also includes a step of receiving, at the deployment manager, on-site sensor information collected by vehicles (e.g., cars and personal vehicles) in the first location.

In some embodiments, the method further includes determining, at the deployment manager, that the first autonomous vehicle repository is at a first distance from the first location. In such cases, the one or more autonomous vehicles can be selected from a subset of autonomous vehicles at the first autonomous vehicle repository with a battery life sufficient to permit travel across at least the first distance, perform its designated functions, and (optionally, as some AVs may be disposable or designated for no-return trips) return to the first autonomous vehicle repository. In different embodiments, the first type of damage is one of flood, fire, tornado, landslide, wind, and hail. In some embodiments, the one or more autonomous vehicles are selected from a subset of autonomous vehicles at the first autonomous vehicle repository with onboard sensors capable of collecting data while exposed to conditions associated with the first type of damage. In another example, the method also includes identifying, using the deep learning damage classification model, a damage magnitude rating associated with the first location. In such cases, a number of autonomous vehicles selected for inclusion in the autonomous vehicle party can be based on the identified damage magnitude level. In some embodiments, the number of autonomous vehicles that are selected when the identified damage magnitude rating is above a preselected level is greater than when the identified damage magnitude rating is below the preselected level.

In different embodiments, the autonomous vehicle party can include at one type of autonomous vehicle, such as a monitoring autonomous vehicle, a repair autonomous vehicle, a delivery autonomous vehicle, a recharging autonomous vehicle, an emergency services beaconing autonomous vehicle, and a recovery autonomous vehicle. The number of autonomous vehicles in the autonomous vehicle party, as well as the type of autonomous vehicle, can be selected by the damage response system based on the damage rating and type described by the damage assessment. In other words, in response to a first damage assessment with a first damage rating, the system can select a first autonomous vehicle type, while in response to a second damage assessment with a second damage rating that differs from the first damage rating, the system can select a different, second autonomous vehicle type. In one example, the system is configured to select autonomous vehicles that are better adapted for performance to the conditions described in the damage assessment and/or more appropriate (battery capacity and quantity, battery chemistry, types of onboard sensors, carrying capacity, autonomous vehicle-based tools, autonomous vehicle-dismountable autonomous robotics, etc.) for the operations to be performed during the mission.

As described herein, some of the proposed embodiments can be understood to include a damage response system. The damage response system can be used to provide services to a disaster-impacted location. In different embodiments, the system includes a damage detection module configured to generate a damage assessment based on a plurality of aerial sensor data of a first location, and a deployment manager configured to select an autonomous vehicle party comprising one or more autonomous vehicles for deployment to the first location based on the damage assessment. In some embodiments, the system also includes a controller configured to trigger deployment of the autonomous vehicle party to the first location in response to instructions received from the deployment manager. In one example, the autonomous vehicle party is selected from a set of autonomous vehicles loaded on a transport vehicle after the transport vehicle arrives at the first location.

It is appreciated that methods in accordance with the present disclosure can include any combination of the aspects and features described herein. That is, methods and systems in accordance with the present disclosure are not limited to the combinations of aspects and features specifically described herein, but also include any combination of the aspects and features provided.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/ or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), Transmission Control Protocol (TCP), User Datagram Protocol (UDP), IP multicasting, hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, or holographic projector for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A computer-implemented method of providing services to a disaster-impacted location, the method comprising:
   automatically determining, using a damage detection module executing on a controller comprising a processor, that a first type of damage has impacted a first location;
   automatically generating, using a damage classifier executing on the controller at the damage detection module, a first damage assessment including details regarding the first type of damage;
   communicating the first damage assessment to an autonomous vehicle transport manager executing on the controller;
   using the autonomous vehicle transport manager to identify a plurality of autonomous vehicles from a fleet of autonomous vehicles based on the first damage assessment, each autonomous vehicle in the plurality of autonomous vehicles performing a specific task or set of tasks;
   loading the plurality of autonomous vehicles on a transport vehicle;
   moving the transport vehicle to a position near the first location;

receiving, at a deployment manager executing on the controller and from the damage detection module, the first damage assessment;
   automatically selecting, using the first damage assessment as an input in a machine learning model running in an autonomous vehicle assignment generator on the deployment manager a mixed pattern and number of one or more autonomous vehicles from the plurality of autonomous vehicles on the transport vehicle likely to fulfill requirements and perform needed response tasks in the first location to include in an autonomous vehicle party for deployment to the first location;
   transmitting schedules and assignments for the selected one or more autonomous vehicles in the autonomous vehicle party from the autonomous vehicle assignment generator to the autonomous vehicle transport manager, the autonomous vehicle transport manager providing instructions to the selected one or more autonomous vehicles for deployment to the first location; and
   deploying the selected one or more autonomous vehicles from the transport vehicle to the first location.

2. The method of claim 1, further comprising:
   receiving, at the damage detection module, a plurality of aerial sensor data of the first location; and
   employing a deep learning damage classification model using the plurality of aerial sensor data to identify the first type of damage.

3. The method of claim 1, wherein the fleet of autonomous vehicles is selected based on the fleet of autonomous being nearest to the first location.

4. The method of claim 1, further comprising receiving, at the deployment manager, on-site sensor information collected by vehicles in the first location.

5. The method of claim 1, further comprising determining, at the deployment manager, that the plurality of autonomous vehicles on the transport vehicle is at a first distance from the first location, wherein the one or more autonomous vehicles are selected from a subset of autonomous vehicles on the transport vehicle with a battery life sufficient to permit travel across at least the first distance, perform a given specific task or set of tasks, and return to the transport vehicle.

6. The method of claim 1, wherein the first type of damage is one of flood, fire, tornado, landslide, wind, and hail.

7. The method of claim 6, wherein the one or more autonomous vehicles are selected from a subset of autonomous vehicles on the transport vehicle with onboard sensors capable of collecting data while exposed to conditions associated with the first type of damage.

8. The method of claim 2, further comprising identifying, using the deep learning damage classification model, a damage magnitude rating associated with the first location, wherein a number of autonomous vehicles selected for inclusion in the autonomous vehicle party is based on the identified damage magnitude rating.

9. The method of claim 8, wherein the number of autonomous vehicles that are selected when the identified damage magnitude rating is above a preselected level is greater than when the identified damage magnitude rating is below the preselected level.

10. A damage response system for providing services to a disaster-impacted location, the system comprising:
   a damage detection module executing on a controller comprising a processor to generate a damage assessment based on a plurality of aerial sensor data of a first location;
   an autonomous vehicle transport manager executing on the controller to identify a plurality of autonomous vehicles from a fleet of autonomous vehicles based on the damage assessment, each autonomous vehicle in the plurality of autonomous vehicles performing a specific task or set of tasks; and a deployment manager executing on the controller to use the first damage assessment as an input in a machine learning model running in an autonomous vehicle assignment generator on the deployment manager to select an autonomous vehicle party comprising a mixed pattern and number of one or more autonomous vehicles from a plurality of autonomous vehicles selected from the fleet of autonomous vehicles loaded onto a transport and transported to a position near the first location for deployment to the first location based on the damage assessment that are likely to fulfill requirements and perform needed response tasks in the first location.

11. The damage response system of claim 10, wherein the controller triggers deployment of the autonomous vehicle party to the first location in response to instructions received from the deployment manager.

12. The damage response system of claim 10, wherein the plurality of autonomous vehicles is loaded on the transport vehicle by an autonomous vehicle transport manager executing on the controller.

13. A system for providing services to a disaster-impacted location, the system comprising a processor and machine-readable media including instructions which, when executed by the processor, cause the processor to:

automatically determine, using a damage detection module executing on a controller comprising a processor, that a first type of damage has impacted a first location;

automatically generate, using a damage classifier executing on the controller, a first damage assessment including details regarding the first type of damage;

communicate the first damage assessment to an autonomous vehicle transport manager executing on the controller;

use the autonomous vehicle transport manager to identify a plurality of autonomous vehicles from a fleet of autonomous vehicles based on the first damage assessment, each autonomous vehicle in the plurality of autonomous vehicles performing a specific task or set of tasks;

load the plurality of autonomous vehicles on a transport vehicle;

move the transport vehicle to a position near the first location;

receive, at a deployment manager executing on the controller and from the damage detection module, the first damage assessment;

automatically select, using the first damage assessment as an input in a machine learning model running in an autonomous vehicle assignment generator on the deployment manager a mixed pattern and number of one or more autonomous vehicles from the plurality of autonomous vehicles on the transport vehicle likely to fulfill requirements and perform needed response tasks in the first location to include in an autonomous vehicle party for deployment to the first location;

transmit schedules and assignments for the selected one or more autonomous vehicles in the autonomous vehicle party from the autonomous vehicle assignment generator to the autonomous vehicle transport manager, the autonomous vehicle transport manager providing instructions to the selected one or more autonomous vehicles for deployment to the first location; and deploy the selected one or more autonomous vehicles from the transport vehicle to the first location.

14. The system of claim 13, wherein the instructions further cause the processor to:

receive, at the damage detection module, a plurality of aerial sensor data of the first location; and employ a deep learning damage classification model using the plurality of aerial sensor data to identify the first type of damage.

15. The system of claim 13, wherein the fleet of autonomous vehicles is selected based on the fleet of autonomous vehicles being nearest to the first location.

16. The system of claim 13, wherein the instructions further cause the processor to receive, at the deployment manager, on-site sensor information collected by vehicles in the first location.

17. The system of claim 13, wherein the instructions further cause the processor to determine, at the deployment manager, that the plurality of autonomous vehicles on the transport vehicle is at a first distance from the first location, wherein the one or more autonomous vehicles are selected from a subset of autonomous vehicles on the transport vehicle with a battery life sufficient to permit travel across at least the first distance, perform a given specific task or set of tasks, and return to the transport vehicle.

18. The system of claim 13, wherein the first type of damage is one of flooding, fire, wind, and hail.

19. The system of claim 18, wherein the one or more autonomous vehicles are selected from a subset of autonomous vehicles on the transport vehicle with onboard sensors capable of collecting data while exposed to conditions associated with the first type of damage.

20. The system of claim 14, wherein the instructions further cause the processor to identify, using the deep learning damage classification model, a damage magnitude rating associated with the first location, wherein a number of autonomous vehicles selected for inclusion in the autonomous vehicle party is based on the identified damage magnitude rating.

* * * * *